United States Patent
Gahleitner et al.

(10) Patent No.: US 11,952,481 B2
(45) Date of Patent: Apr. 9, 2024

(54) HETEROPHASIC POLYPROPYLENE COMPOSITION WITH HIGH FLEXIBILITY AND SOFTNESS

(71) Applicant: BOREALIS AG, Vienna (AT)

(72) Inventors: Markus Gahleitner, Neuhofen/Krems (AT); Jingbo Wang, Engerwitzdorf (AT); Klaus Bernreitner, Linz (AT); Peter Wilfried Toltsch, Marchtrenk (AT); Simon Schwarzenberger, Linz (AT)

(73) Assignee: BOREALIS AG, Vienna (AT)

( * ) Notice: Subject to any disclaimer, the term of this patent is extended or adjusted under 35 U.S.C. 154(b) by 933 days.

(21) Appl. No.: 16/959,628

(22) PCT Filed: Jan. 9, 2019

(86) PCT No.: PCT/EP2019/050361
§ 371 (c)(1),
(2) Date: Jul. 1, 2020

(87) PCT Pub. No.: WO2019/141546
PCT Pub. Date: Jul. 25, 2019

(65) Prior Publication Data
US 2020/0369861 A1  Nov. 26, 2020

(30) Foreign Application Priority Data
Jan. 18, 2018  (EP) .................................. 18152238

(51) Int. Cl.
| C08L 23/14 | (2006.01) |
| C08F 4/6592 | (2006.01) |
| C08F 10/06 | (2006.01) |
| C08F 210/06 | (2006.01) |
| C08F 210/16 | (2006.01) |
| C08L 23/16 | (2006.01) |

(52) U.S. Cl.
CPC ........ *C08L 23/142* (2013.01); *C08F 4/65927* (2013.01); *C08F 10/06* (2013.01); *C08F 210/06* (2013.01); *C08F 210/16* (2013.01); *C08L 23/16* (2013.01); C08L 2205/22 (2013.01); C08L 2207/02 (2013.01); C08L 2314/06 (2013.01)

(58) Field of Classification Search
CPC .... C08L 23/142; C08L 2207/02; C08L 23/16; C08L 2314/06; C08F 4/65912; C08F 2420/07; C08F 4/6592; C08F 10/06; C08F 110/06; C08F 210/16
See application file for complete search history.

(56) References Cited

U.S. PATENT DOCUMENTS

| 4,303,739 A * | 12/1981 | Beckmann | ........ B32B 17/10045 |
| | | | 156/99 |
| 5,468,440 A * | 11/1995 | McAlpin | ................... D01F 6/06 |
| | | | 156/244.14 |
| 2014/0206819 A1* | 7/2014 | Hafner | ..................... C07F 17/00 |
| | | | 525/240 |

FOREIGN PATENT DOCUMENTS

| CN | 102597098 A | 7/2012 |
| CN | 106062014 A | 10/2016 |
| CN | 111032707 A | 4/2020 |
| EP | 0887379 A1 | 12/1998 |
| EP | 2048185 A1 | 4/2009 |
| EP | 2452975 A1 | 5/2012 |
| RU | 2446181 C1 | 3/2012 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2006097497 A1 | 9/2006 |
| WO | 2011076780 A1 | 6/2011 |
| WO | 2013092620 A1 | 6/2013 |
| WO | 2014075973 A1 | 5/2014 |
| WO | 2015139875 A1 | 9/2015 |

OTHER PUBLICATIONS

Russian Search Report for Application No. 2020125261/04(043874), Filed: Jan. 9, 2019; dated Jan. 25, 2021; 4 pgs.
Applicant: Borealis AG, AT; Examination Report of Russian Application No. 2020125261/04(043874); Filed: Jan. 9, 2019; dated Jan. 27, 2021; 8 pgs.
International Search Report for Application No. PCT/EP2019/050361 dated Mar. 18, 2019.
Applicant: Borealis AG; "Heterophasic polypropylene composition with high flexibility and softness"; Chinese Office Action of Chinese Application No. 201980006996.8; dated Jul. 28, 2022; 21 pgs.

* cited by examiner

*Primary Examiner* — Jeffrey C Mullis
(74) *Attorney, Agent, or Firm* — TAROLLI, SUNDHEIM, COVELL & TUMMINO L.L.P.

(57) ABSTRACT

The present invention relates to a heterophasic propylene copolymer polymerized the presence of a single-site catalyst with a low tensile modulus, a process for preparing such a heterophasic propylene copolymer and articles made therefrom.

Figure 1A:
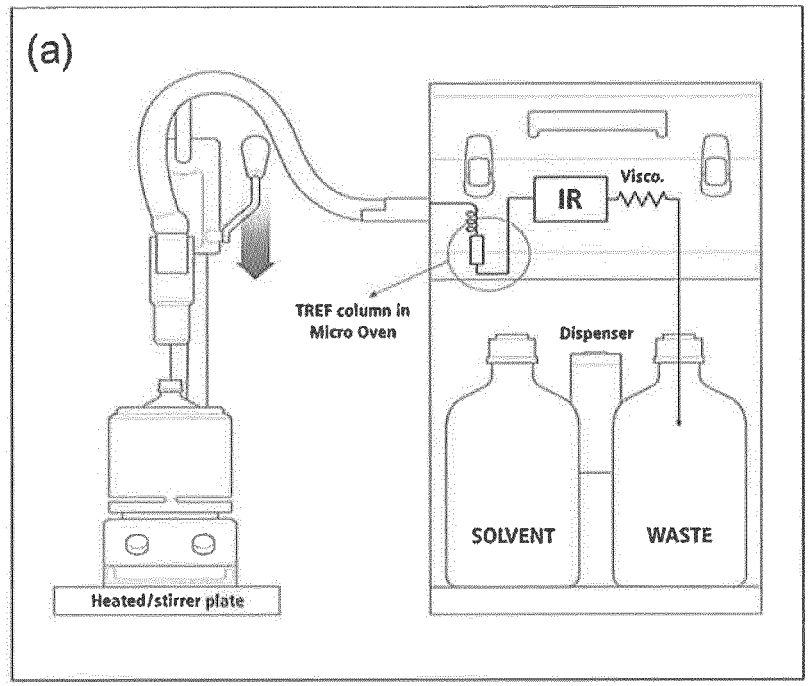

13 Claims, 2 Drawing Sheets

HETEROPHASIC POLYPROPYLENE COMPOSITION WITH HIGH FLEXIBILITY AND SOFTNESS

The present invention relates to a heterophasic propylene copolymer with a low tensile modulus, a process for preparing such a heterophasic propylene copolymer and articles made therefrom.

BACKGROUND OF THE INVENTION

There is an increasing trend in the packaging and film industry to use plastic containers. Polyolefin materials are very often used in this field.

One of the main properties required in the packaging and film industry are good mechanical properties like softness and flexibility are required for packaging applications.

Especially, heterophasic propylene copolymers, which usually have a tensile modulus in the range of about 1000 MPa or more, can be tuned to rubber-like materials with very low tensile moduli of around 20 MPa which are suitable for thin-wall packaging to soft-touch products like sealants, flexible tubes etc.

Currently, the main source for commercially available soft polypropylene based products are based on the Catalloy™-process from Lyondell-Basell in which heterophasic propylene copolymers are produced in the presence of a specific Ziegler-Natta catalyst in a sequence of up to four sequential gas phase reactors to maximize the rubber production. These resins are commercially available from Lyondell-Basell under the tradename "Adflex", However, due to the limitations of the polymerization process the properties of these resins are to a certain extent limited, especially in regard of their hardness and higher melt flow rates are difficult to obtain.

Thus, there is a need in the art for heterophasic propylene polymer resins with a high flexibility (i.e. a low tensile modulus) which also show a low hardness (e.g. in Shore D hardness) which can be produced over a broad $MFR_2$ range.

It has surprisingly been found that by using single-site catalysts in a multi-stage polymerization process heterophasic propylene polymers can be produced with a low tensile modulus, low Shore D hardness over a broad $MFR_2$ range.

SUMMARY OF THE INVENTION

The present invention relates to a heterophasic polypropylene composition comprising a polymer base resin which comprises a matrix phase and an elastomeric phase dispersed therein, wherein the matrix phase and the elastomeric phase are polymerized in the presence of a single-site catalyst; and wherein the polymer base resin comprises (A) from 20 to 55 wt % of a crystalline fraction (CF), measured by Crystex QC in trichlorobenzene, which is a propylene homopolymer fraction or a copolymer fraction of propylene monomer units and comonomer units of ethylene or alpha-olefins with 4 to 12 carbon atoms with an amount of comonomer units of up to 6.0 wt %; and (B) from 45 to 80 wt % of a soluble fraction (SF), measured by Crystex QC in trichlorobenzene, which is a copolymer of propylene monomer units and comonomer units of ethylene or alpha-olefins with 4-12 carbon atoms, with an amount of comonomer units of from 17 to 55 wt % and an intrinsic viscosity iV of from 1.2 to 7.0 dl/g, wherein the heterophasic polypropylene composition has a tensile modulus of not more than 700 MPa.

In another aspect the present invention relates to a process for preparing the heterophasic polypropylene composition as defined above or below comprising the steps of:

a) polymerizing propylene and optionally comonomer units selected from ethylene or alpha-olefins with 4 to 12 carbon atoms in a first polymerization reactor in the presence of a single-site catalyst to produce a first polymerization mixture comprising a first propylene homo- or copolymer and the single-site catalyst;

b) transferring the first polymerization mixture into a second polymerization reactor;

c) polymerizing propylene and comonomer units selected from ethylene or alpha-olefins with 4 to 12 carbon atoms in said second polymerization reactor in the presence of said single-site catalyst to produce a second polymerization mixture comprising a second propylene copolymer, said first propylene homo- or copolymer and the single-site catalyst, wherein the weight ratio of said first propylene homo- or copolymer to said second propylene copolymer is in the range of 20:80 to 55:45;

d) withdrawing said second polymerization mixture from said second polymerization reactor; and e) compounding said second polymerization mixture optionally with the addition of additives to form the heterophasic polypropylene composition.

Further, the present invention relates to an article comprising the heterophasic polypropylene composition as defined above or below.

Still further, the present invention relates to the use of the heterophasic polypropylene composition as defined above or below for the production of an article.

Definitions

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. The elastomeric phase can be a propylene copolymer with a high amount of comonomer which is not randomly distributed in the polymer chain but are distributed in a comonomer-rich block structure and a propylene-rich block structure.

A heterophasic polypropylene usually differentiates from a one-phasic propylene copolymer in that it shows two distinct glass transition temperatures Tg which are attributed to the matrix phase and the elastomeric phase.

A propylene homopolymer is a polymer which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

A propylene random copolymer is a copolymer of propylene monomer units and comonomer units, preferably selected from ethylene and $C_4$-$C_{12}$ alpha-olefins, in which the comonomer units are distributed randomly over the polymeric chain. The propylene random copolymer can comprise comonomer units from one or more comonomers different in their amounts of carbon atoms.

A polymer base resin is meant as the entirety of all polymeric components present in the heterophasic polypropylene composition as defined above or below. The polymer base resin can consist only of the matrix phase and the elastomeric phase. However, the polymer base resin can comprise further polymeric components other than the matrix phase and the elastomeric phase. The polymer base resin is preferably a polypropylene base resin, which means that the majority of the weight amount of the polymer base resin results from propylene homo- or copolymers.

In the following amounts are given in % by weight (wt %) unless it is stated otherwise.

FIGURES

FIG. 1a shows a schematic diagram of the CRYSTEX QC instrument.

Figure 1B:
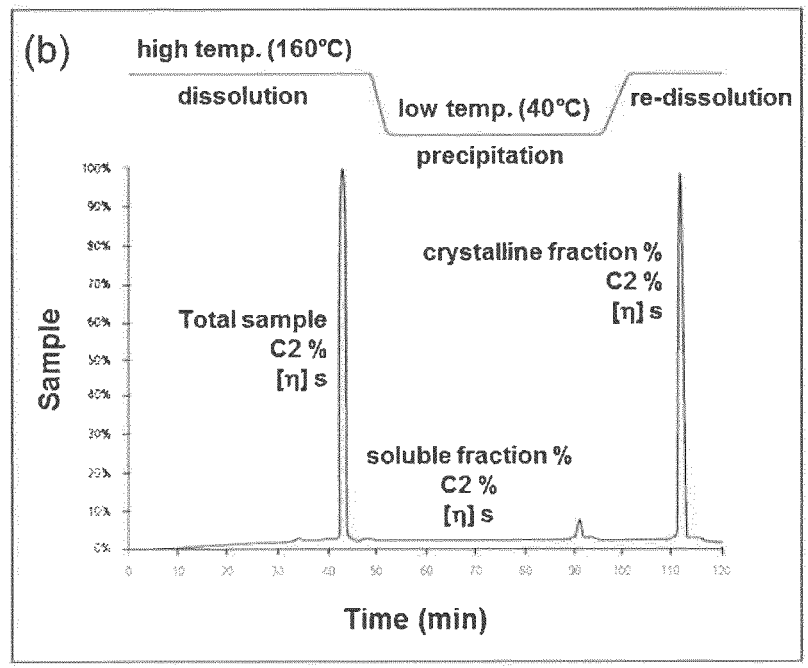

FIG. 1b shows an elution diagram of an exemplary ethylene-propylene copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene, The Column Advanstar Publications, February 2014. Pages 18-23).

Figure 2:
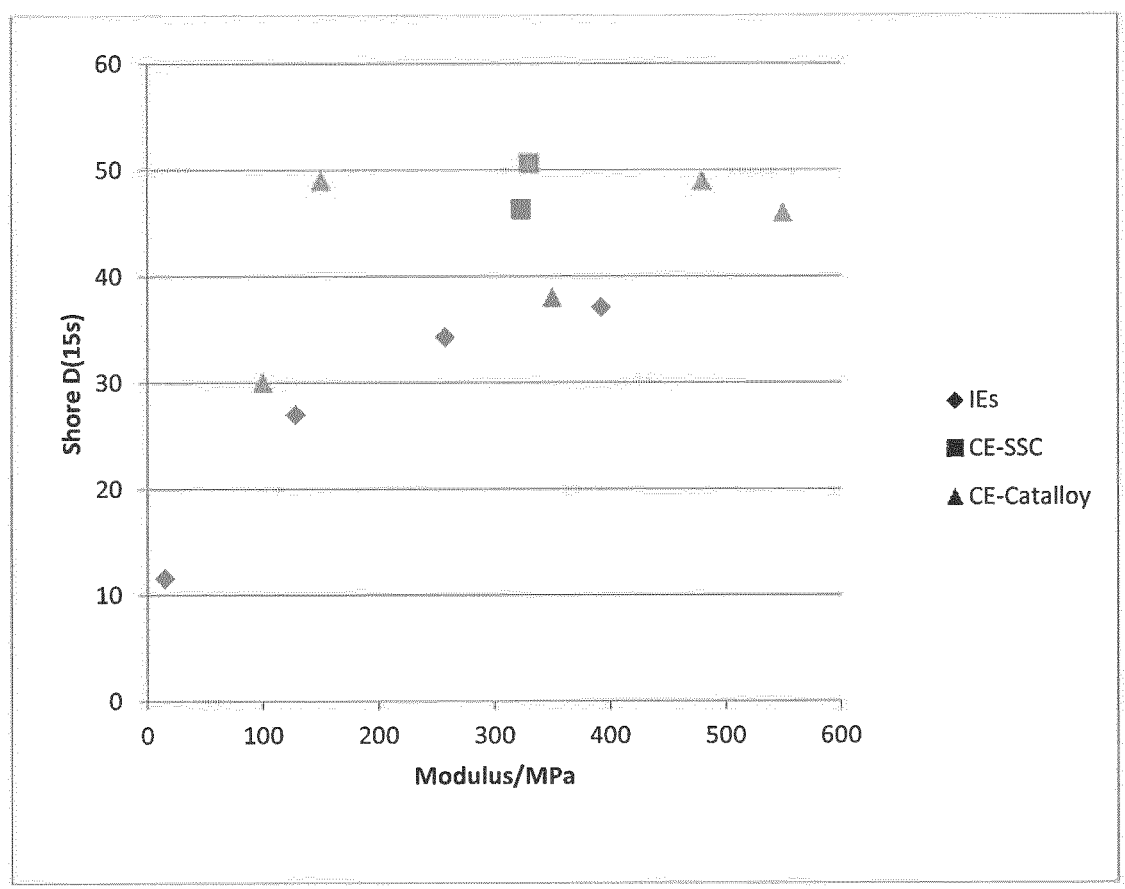

FIG. 2 shows a modulus to Shore D hardness graph of examples IE1-4, CE5-6 and RE7-19.

DETAILED DESCRIPTION

Heterophasic Polypropylene Composition

The heterophasic polypropylene composition according to the present invention comprises a polymer base resin which comprises a matrix phase and an elastomeric phase dispersed therein.

Besides the polymer base resin the heterophasic polypropylene composition can comprise one or more additives in an amount of from 0.0 up to 5.0 wt %, based on the total amount of the heterophasic polypropylene composition. The one or more additives are selected from slip agents, antiblock agents, UV stabilizers, acid scavengers, antioxidants, alpha- and/or beta nucleating agents, antistatic agents, pigments, etc. Such additives are commonly known to a person skilled in the art. Usually, these additives are added in quantities of 100 to 2,000 ppm for each single component.

The one or more additives can be added to the polymer base resin in a blending step after polymerization of the matrix phase and the elastomeric phase.

Thereby, the one or more additives can be added to the polymer base resin in form of master batches in which one or more additives are blended with a carrier polymer in concentrated amounts. Any optional carrier polymer is calculated to the amount of additives, based on the total amount of the heterophasic polypropylene composition. The heterophasic polypropylene composition has tensile modulus of not more than 700 MPa, preferably not more than 600 MPa, more preferably not more than 500 MPa, still more preferably not more than 450 MPa, and most preferably not more than 400 MPa.

The lower limit of the tensile modulus of the heterophasic polypropylene composition is not generally limited and can be as low as 1 MPa, preferably as low as 5 MPa, more preferably as low as 10 MPa.

The heterophasic polypropylene according to the present invention not only shows a high flexibility but preferably also a high softness.

Thereby, the heterophasic polypropylene composition preferably has a Shore D hardness of not more than 50, more preferably not more than 45 and most preferably not more than 40. The lower limit of the Shore D hardness of the heterophasic polypropylene composition is not generally limited and can be as low as 10, preferably as low as 12 and most preferably as low as 15.

Further, the heterophasic polypropylene composition preferably has a Shore A hardness of not more than 100. The lower limit of the Shore A hardness of the heterophasic polypropylene composition is not generally limited and can be as low as 50, preferably as low as 60 and most preferably as low as 65.

It has been found that the lower the tensile modulus of the heterophasic polypropylene composition, the lower is also the Shore D and Shore A hardness. Thus, for a heterophasic polypropylene composition with a tensile modulus of up to 100 MPa the Shore D hardness is preferably less than 30, more preferably not more than 28. The lower limit can be as low as 10.

The Shore A hardness of a heterophasic polypropylene composition with a tensile modulus of up to 100 MPa is preferably less than 95, more preferably not more than 92. The lower limit can be as low as 50.

For a heterophasic polypropylene composition with a tensile modulus of from 100 MPa to 200 MPa the Shore D hardness is preferably less than 40, more preferably not more than 35. The lower limit can be as low as 15.

The Shore A hardness of a heterophasic polypropylene composition with a tensile modulus of from 100 MPa to 200 MPa is preferably less than 100, more preferably not more than 95. The lower limit can be as low as 60.

For a heterophasic polypropylene composition with a tensile modulus of from 200 MPa to 400 MPa the Shore D hardness is preferably less than 45, more preferably less than 40. The lower limit can be as low as 20.

The Shore A hardness of a heterophasic polypropylene composition with a tensile modulus of from 200 MPa to 400 MPa is preferably less than 100. The lower limit can be as low as 75.

The melt flow rate $MFR_2$ (230° C., 2.16 kg) of the heterophasic polypropylene composition is not particularly limited. Thus, the melt flow rate $MFR_2$ (230° C., 2.16 kg) of the heterophasic polypropylene composition is preferably in the range of 0.05 to 100 g/10 min, more preferably in the range of 0.10 to 70 g/10 min, like in the range of 0.15 to 50 g/10 min.

The heterophasic polypropylene composition preferably has a total amount of comonomer units as determined by $^{13}C$ NMR spectroscopy of from 6.0 to 35.0 wt %, more preferably of from 7.5 to 30.0 wt % and most preferably of from 10.0 to 27.0 wt %, based on the total amount of the heterophasic polypropylene composition.

Preferably, the heterophasic polypropylene composition has a total intrinsic viscosity iV as determined in decalin at 135° C. of from 1.2 to 7.0 dl/g, more preferably of from 1.5 to 5.5 dl/g and most preferably of from 1.7 to 5.0 dl/g.

Still further, the heterophasic polypropylene composition has a storage modulus G' as determined in dynamic mechanical analysis (DMA) at 23° C. of from 20 MPa to 300 MPa, more preferably of from 30 MPa to 250 MPa and most preferably of from 35 MPa to 200 MPa.

The heterophasic polypropylene composition preferably has a melting temperature as determined by differential scanning calorimetry (DSC) of from 135° C. to 165° C., more preferably of from 140° C. to 160° C. and most preferably of from 145° C. to 158° C.

Further, the heterophasic polypropylene composition has at least two glass transition temperatures Tg1 and Tg2 as determined in dynamic mechanical analysis (DMA). Tg1 is attributed to the elastomeric phase and is preferably in the range of from −75° C. to −20° C., more preferably in the range of from −70° C. to −25° C. and most preferably in the range of from −65° C. to −30° C.

Tg2 is attributed to the matrix phase and is preferably in the range of from −15° C. to 15° C., more preferably in the range of from −10° C. to 10° C. and most preferably in the range of from −5° C. to 5° C.

Polymer Base Resin

The polymer base resin comprises a matrix phase and an elastomeric phase dispersed therein. The matrix phase and the elastomeric phase are both polymerized in the presence of a single-site catalyst.

The polymer base resin can comprise further polymeric components other than the matrix phase and the elastomeric phase. These additional polymeric components can be introduced into the polymer base resin either by in-situ blending, i.e. by polymerizing the additional polymeric components in one or more polymerization stages of a multi-stage polymerization process in which the different polymeric components are polymerized in the presence of each other or in a post-polymerization blending step such as dry-blending or melt-blending.

However, in a preferred embodiment the polymer base resin consists of the matrix phase and the elastomeric phase.

The comonomer units of the polymer base resin are preferably selected from ethylene and alpha-olefins with 4 to 12 carbon atoms. Especially preferred are comonomer units selected from ethylene, 1-butene, 1-hexene and 1-octene. Mostly preferred is ethylene.

The comonomer units of the polymer base resin can be selected from one or more than one comonomer units selected from ethylene and alpha-olefins with 4 to 12 carbon atoms.

Thereby, the elastomeric phase can include the same comonomer units as the matrix phase or can include different comonomer units as the matrix phase.

It is preferred that the comonomer units of the base resin are selected from one sort of comonomer units. As a consequence the comonomer units of the matrix phase and the elastomeric phase are the same.

In a preferred embodiment the matrix phase and the elastomeric phase only include propylene monomer units and ethylene comonomer units.

In a heterophasic polypropylene composition the matrix phase and the elastomeric phase usually cannot exactly be divided from each other. In order to characterize the matrix phase and the elastomeric phase of a heterophasic polypropylene composition several methods are known. One method is the extraction of a fraction which contains to the most part the elastomeric phase with xylene, thus separating a xylene cold solubles (XCS) fraction from a xylene cold insoluble (XCI) fraction. The XCS fraction contains for the most part the elastomeric phase and only a small part of the matrix phase whereas the XCI fraction contains for the most part the matrix phase and only a small part of the elastomeric phase. The xylene extraction is especially suitable for heterophasic polypropylene compositions with a highly crystalline matrix phase such as propylene homopolymer matrix phase or propylene random copolymer matrix phase with a low comonomer content of not more than about 3 wt %. For heterophasic polypropylene compositions with a propylene random copolymer matrix phase with comonomer contents of more than about 3 wt % the amount of matrix phase in the XCS fraction is so high (about 5 wt % or higher) that the XCS fraction cannot be suitably used for characterizing the elastomeric phase of the heterophasic polypropylene composition as the high amount of matrix phase in the XCS fraction cannot be neglegted.

Another method is the separation of a crystalline fraction and a soluble fraction with the CRYSTEX QC method using trichlorobenzene (TCB) as solvent. This method is described below in the measurement methods section. In this method, a crystalline fraction (CF) and a soluble fraction (SF) are separated from each other. The crystalline fraction (CF) contains for the most part the matrix phase and only a small part of the elastomeric phase and the soluble fraction (SF) contains for the most part the elastomeric phase and only a small part of the matrix phase. This method is more suitable for characterizing the crystalline phase and the elastomeric phase of heterophasic polypropylene compositions with a propylene random copolymer matrix phase with comonomer contents of more than about 3 wt %, as by means of the CRYSTEX QC method only a small amount of matrix phase is separated in the soluble fraction (SF).

Due to the differences in the separation methods of xylene extraction and CRYSTEX QC method the properties of XCS/XCI fractions on the one hand and crystalline/soluble (CF/SF) fractions on the other hand are not exactly the same, meaning that the amounts of matrix phase and elastomeric phase can differ as well as the properties.

The polymer base resin preferably has an amount of XCS fraction of from 40 wt % to 75 wt %, more preferably from 45 wt % to 70 wt % and most preferably from 47 wt % to 67 wt %, based on the total amount of the polymer base resin.

Preferably the XCS fraction has a comonomer content of from 10 wt % to 45 wt %, more preferably from 15 wt % to 40 wt % and most preferably from 17 wt % to 35 wt %, based on the total amount of monomer units in the XCS phase.

Thereby, the remaining amount of monomer units of the XCS fraction making up to 100 wt % is the amount of propylene monomer units.

The comonomer units of the XCS fraction are preferably selected from one or more comonomer units selected from ethylene and alpha-olefins with 4 to 12 carbon atoms, more preferably the comonomer units are selected from ethylene, 1-butene, hexene and 1-octene.

It is preferred that the XCS phase only contains one sort of comonomer units as defined above.

In an especially preferred embodiment, the comonomer units of then XCS fraction are ethylene comonomer units.

Further, the XCS fraction preferably has an intrinsic viscosity iV of from 1.0 dl/g to 7.0 dl/g, more preferably from 1.3 dl/g to 5.0 dl/g, and most preferably from 1.5 dl/g to 4.0 dl/g.

The XCI fraction is preferably present in the base resin in an amount of from 25 wt % to 60 wt %, more preferably from 30 wt % to 55 wt % and most preferably from 33 wt % to 53 wt %, based on the total amount of the polymer base resin.

Preferably the XCI fraction has a comonomer content of from 0.1 wt % to 15 wt %, more preferably from 0.5 wt % to 12 wt % and most preferably from 0.7 wt % to 10 wt %, based on the total amount of monomer units in the XCI fraction.

Thereby, the remaining amount of monomer units of the XCI fraction making up to 100 wt % is the amount of propylene monomer units.

The comonomer units of the XCI fraction are preferably selected from one or more comonomer units selected from ethylene and alpha-olefins with 4 to 12 carbon atoms, more preferably the comonomer units are selected from ethylene, 1-butene, 1-hexene and 1-octene.

It is preferred that the XCI fraction only contains one sort of comonomer units as defined above.

In an especially preferred embodiment, the comonomer units of then XCI fraction are ethylene comonomer units

Crystalline Fraction of the CRYSTEX QC Measurement

The crystalline fraction (CF) of the CRYSTEX QC measurement is preferably present in the polymer base resin in an amount of from 20 wt % to less than 55 wt %, more preferably from 25 wt % to 53 wt %, most preferably from 30 wt % to 52 wt %, based on the total amount of polymer base resin.

Preferably the crystalline fraction (CF) has a comonomer content of up to 6.0 wt %, like from 0.1 wt % to 6.0 wt %, more preferably from 0.5 wt % to 5.0 wt % and most preferably from 0.7 wt % to 4.0 wt %, based on the total amount of monomer units in the crystalline fraction (CF).

Thereby, the remaining amount of monomer units of the crystalline fraction (CF) making up to 100 wt % is the amount of propylene monomer units.

The comonomer units of the crystalline fraction (CF) are preferably selected from one or more comonomer units selected from ethylene and alpha-olefins with 4 to 12 carbon atoms, more preferably the comonomer units are selected from ethylene, 1-butene, 1-hexene and 1-octene.

It is preferred that the crystalline fraction (CF) only contains one sort of comonomer units as defined above.

In an especially preferred embodiment, the comonomer units of then crystalline fraction (CF) are ethylene comonomer units Further, the crystalline fraction (CF) preferably has an intrinsic viscosity iV of from 1.0 dl/g to 7.0 dl/g, more preferably from 1.3 dl/g to 5.0 dl/g, and most preferably from 1.4 dl/g to 4.0 dl/g, like from 1.5 dl/g to 3.5 dl/g.

Soluble Fraction (SF) of the CYSTEX QC Measurement

The soluble fraction (SF) of the CRYSTEX QC measurement is preferably present in the polymer base resin in an amount of from more than 45 wt % to 80 wt %, more preferably from 47 wt % to 75 wt %, most preferably from 48 wt % to 70 wt %, based on the total amount of polymer base resin.

The soluble fraction (SF) has a comonomer content of from 17 wt % to 55 wt %, more preferably from 19 wt % to 52 wt % and most preferably from 20 wt % to 50 wt %, based on the total amount of monomer units in the soluble fraction (SF).

Thereby, the remaining amount of monomer units of the soluble fraction (SF) making up to 100 wt % is the amount of propylene monomer units.

The comonomer units of the soluble fraction (SF) are preferably selected from one or more comonomer units selected from ethylene and alpha-olefins with 4 to 12 carbon atoms, more preferably the comonomer units are selected from ethylene, 1-butene, 1-hexene and 1-octene.

It is preferred that the soluble fraction (SF) only contains one sort of comonomer units as defined above.

In an especially preferred embodiment, the comonomer units of the soluble fraction (SF) are ethylene comonomer units Further, the soluble fraction (SF) has an intrinsic viscosity iV of from 1.2 dl/g to 7.0 dl/g, preferably from 1.5 dl/g to 6.0 dl/g, and most preferably from 1.7 dl/g to 5.0 dl/g, like from 1.8 dl/g to 4.5 dl/g.

Preferably, the ratio of the intrinsic viscosity of the soluble fraction (SF) to the intrinsic viscosity of the crystalline fraction (CF), $iV_{SF}/iV_{CF}$, is from 0.6 to 1.8, more preferably from 0.7 to 1.6 and most preferably from 0.8 to 1.5.

Preferably, the ratio of the intrinsic viscosity of the soluble fraction (SF) to the intrinsic viscosity of the heterophasic polypropylene composition, $iV_{SF}/iV_{HECO}$, is from 0.6 to 1.7, more preferably from 0.7 to 1.4 and most preferably from 0.8 to 1.3.

Process

In a further aspect, the present invention also relates to a process for preparing the heterophasic polypropylene composition as defined above or below comprising the steps of:

a) polymerizing propylene and optionally comonomer units selected from ethylene or alpha-olefins with 4 to 12 carbon atoms in a first polymerization reactor in the presence of a single-site catalyst to produce a first polymerization mixture comprising a first propylene homo- or copolymer and the single-site catalyst;

b) transferring the first polymerization mixture into a second polymerization reactor;

c) polymerizing propylene and comonomer units selected from ethylene or alpha-olefins with 4 to 12 carbon atoms in said second polymerization reactor in the presence of said single-site catalyst to produce a second polymerization mixture comprising a second propylene copolymer, said first propylene homo- or copolymer and the single-site catalyst, wherein the weight ratio of said first propylene homo- or copolymer to said second propylene copolymer is in the range of 20:80 to 55:45;

d) withdrawing said second polymerization mixture from said second polymerization reactor; and compounding said second polymerization mixture optionally with the addition of additives to form the heterophasic polypropylene composition.

Polymerization

Preferably, the matrix phase of the polymer base resin is polymerized prior to the elastomeric phase of the polymer base resin in the process of the present invention.

Thereby, preferably the matrix phase makes up the first propylene homo- or copolymer polymerized in process step a) and the elastomeric phase makes up the second propylene copolymer polymerized in process step c).

It is well understood by a person skilled in the art that the first propylene homo- or copolymer preferably reflecting the matrix phase is usually not identical to the crystalline fraction (CF) in the CRYSTEX QC measurement and that the second propylene copolymer preferably reflecting the elastomeric phase is usually not identical to the soluble fraction (SF) in the CRYSTEX QC measurement.

Process step a) can be conducted in a single polymerization reactor. In said embodiment the matrix phase is a unimodal propylene homo- or copolymer. Process step a) can also be conducted in two or more polymerization reactors, such as 2, 3 or 4 polymerization reactors, most preferably 2 polymerization reactors, connected in series.

This means that in a first polymerization reactor of process step a) a first part of the first propylene homo- or copolymer is polymerized in the presence of a single-site catalyst to produce a first part of a first polymerization mixture comprising a first part of the first propylene homo- or copolymer and the single-site catalyst, transferring the first part of the first polymerization mixture into a second polymerization reactor of process step a) and polymerizing a second part of the first propylene homo- or copolymer in the presence of the single site catalyst in the presence of said first part of the first propylene homo- or copolymer to produce a second part of the first polymerization mixture comprising the first and second part of the first propylene homo- or copolymer and the single site catalyst.

These process steps can be repeated further in one or more additional subsequent polymerization reactor(s) of the process step a).

In another embodiment the second part of the first polymerization mixture reflects the first polymerization mixture of process step a) which is then transferred to the second polymerization reactor in process step b).

The polymerization conditions in the first, second and optionally subsequent polymerization reactor(s) of process step a) can be comparable. In said embodiment the matrix phase is a unimodal propylene homo- or copolymer.

Alternatively, the polymerization conditions in the first, second and optionally subsequent polymerization reactor(s) of process step a) can be different from each other, especially in one or more of polymerization temperature, polymerization pressure, comonomer feed or chain transfer agent feed. In said embodiment the matrix phase is a multimodal propylene homo- or copolymer. In the case of two polymerization reactors in series of said embodiment the matrix phase is a bimodal propylene homo- or copolymer.

In said embodiment, it is possible to polymerize a propylene homopolymer in one or more of the polymerization reactors and a propylene random copolymer in one or more of the polymerization reactors. In said embodiment the matrix phase is a multimodal propylene copolymer comprising a propylene homopolymer fraction and a propylene random copolymer fraction. It is especially preferred that a propylene homopolymer is polymerized in one polymerization reactor and a propylene random copolymer is polymerized in the other polymerization reactor of a two reactor sequence to polymerize a matrix phase with one propylene homopolymer fraction and one propylene random copolymer fraction.

There is no special preference in the sequence of the polymerization of the fractions of the matrix phase.

Preferably, the elastomeric phase of the polymer base resin is polymerized after and in the presence of the matrix phase of the polymer base resin in the process of the present invention.

Thereby, preferably the elastomeric phase makes up the second propylene copolymer polymerized in process step c) and the matrix phase makes up the first propylene homo- or copolymer polymerized in process step a).

Process step c) can be conducted in a single polymerization reactor. In said embodiment the elastomeric phase is a unimodal propylene copolymer.

Process step c) can also be conducted in two or more polymerization reactors, such as 2, 3 or 4 polymerization reactors, most preferably 2 polymerization reactors, connected in series.

This means that in a first polymerization reactor of process step c) a first part of the second propylene copolymer is polymerized in the presence of a single-site catalyst to produce a first part of a second polymerization mixture comprising a first part of the second propylene copolymer, the first propylene homo- or copolymer and the single-site catalyst, transferring the first part of the second polymerization mixture into a second polymerization reactor of process step c) and polymerizing a second part of the second propylene copolymer in the presence of the single site catalyst in the presence of said first part of the second propylene copolymer to produce a second part of the second polymerization mixture comprising the first and second part of the second propylene copolymer, the first propylene homo- or copolymer and the single site catalyst.

These process steps can be repeated further in one or more additional subsequent polymerization reactor(s) of the process step c).

In another embodiment the second part of the second polymerization mixture reflects the second polymerization mixture of process step c) which is then withdrawn from the second polymerization reactor of process step c) in process step d).

The polymerization conditions in the first, second and optionally subsequent polymerization reactor(s) of process step c) can be comparable. In said embodiment the elastomeric phase is a unimodal propylene copolymer.

Alternatively, the polymerization conditions in the first, second and optionally subsequent polymerization reactor(s) of process step c) can be different from each other, especially in one or more of polymerization temperature, polymerization pressure, comonomer feed or chain transfer agent feed. In said embodiment the elastomeric phase is a multimodal propylene copolymer. In the case of two polymerization reactors in series of said embodiment the elastomeric phase is a bimodal propylene copolymer.

In said embodiment, it is possible to polymerize propylene copolymers with different comonomers in the two or more of the polymerization reactors. In said embodiment the elastomeric phase is a multimodal propylene copolymer comprising a propylene copolymer fraction with one comonomer and a propylene copolymer fraction with another comonomer.

There is no special preference in the sequence of the polymerization of the fractions of the elastomeric phase.

Preferably, the first polymerization reactor is operating in bulk, such as a loop reactor and all subsequent polymerization reactors, preferably including the optional second and subsequent polymerization reactor(s) of process step a), are operating in gas phase.

It is preferred that the polymerization steps of the process of the present invention are carried out in a bulk polymerization reactor, preferably a loop reactor, followed by one or more, such as 1, 2, 3 or 4, preferably 1 or 2 gas phase reactors, connected in series.

Process step a) can also be preceded by a prepolymerization step. In said embodiment it is preferred that the polymerization steps of the process of the present invention are carried out in a prepolymerization reactor, followed by a bulk polymerization reactor, preferably a loop reactor, followed by one or more, such as 1, 2, 3 or 4, preferably 1 or 2 gas phase reactors, connected in series.

The polymerization conditions, such as polymerization temperature, polymerization pressure, propylene feed, comonomer feed, chain transfer agent feed or residence time of the different polymerization steps are not particularly limited. It is well known to a person skilled in the art how to adjust these polymerization conditions in order to adjust the properties of the first propylene homo- or copolymer and the second propylene copolymer.

The residence time in process steps a) and c) are preferably selected as such that the weight ratio of the first propylene homo- or copolymer to the second propylene copolymer is in the range of from 20:80 to 55:45.

Preferably the weight ratio of said first propylene homo- or copolymer to said second propylene copolymer is in the range of from 25:75 to 53:47, more preferably in the range of from 30:70 to 50:50, most preferably in the range of from 35:65 to 47:53.

Suitably the polymerization steps of the process of the present invention is conducted in a "loop-gas phase"-process, such as developed by Borealis and known as BORSTAR™ technology. Examples of this process are described in EP 0 887 379, WO 92/12182, WO 2004/000899, WO 2004/111095, WO 99/24478, WO 99/24479 and WO 00/68315. These patent applications also describe suitable polymerization conditions. Another suitable process is the slurry-gas phase process called Spheripol™ process.

Single Site Catalyst

The heterophasic polypropylene composition of the present invention is polymerized in the presence of a single-site catalyst.

The catalyst used in the invention can be used in non-supported form or in solid form. The catalyst of the invention should however be used as a heterogeneous (solid) catalyst.

Generally the quantity of catalyst will depend upon the nature of the catalyst, the reactor types and conditions and the properties desired for the polypropylene composition.

The catalyst of the invention in solid form, preferably in solid particulate form, can be either supported on an external carrier material, like silica or alumina, or, in a particularly preferred embodiment, is free from an external carrier, however still being in solid form. For example, the solid catalyst is obtainable by a process in which (a) a liquid/liquid emulsion system is formed, said liquid/liquid emulsion system comprising a solution of the catalyst components (i) a complex and (ii) a cocatalyst; dispersed in a solvent so as to form dispersed droplets; and (b) solid particles are formed by solidifying said dispersed droplets.

The catalyst is ideally manufactured by obtaining (i) a complex e.g. of formula (I) and (ii) a cocatalyst; forming a liquid/liquid emulsion system, which comprises a solution of catalyst components (i) and (ii) dispersed in a solvent, and solidifying said dispersed droplets to form solid particles.

By free from an external carrier is meant that the catalyst does not contain an external support, such as an inorganic support, for example, silica or alumina, or an organic polymeric support material.

In the definitions which follow, the term $C_{1-20}$hydrocarbyl group therefore includes $C_{1-20}$alkyl, $C_{2-20}$alkenyl, $C_{2-20}$alkynyl, $C_{3-20}$cycloalkyl, $C_{3-20}$cycloalkenyl, $C_{6-20}$aryl groups, $C_{7-20}$alkylaryl groups or $C_{7-20}$arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$hydrocarbyl groups are $C_{1-20}$alkyl, $C_{4-20}$cycloalkyl, $C_{5-20}$cycloalkyl-alkyl groups, $C_{7-20}$alkylaryl groups, $C_{7-20}$arylalkyl groups or $C_{6-20}$aryl groups, especially $C_{1-10}$alkyl groups, $C_{6-10}$aryl groups, or $C_{7-12}$arylalkyl groups, e.g. $C_{1-8}$alkyl groups. Most especially preferred hydrocarbyl groups are methyl, ethyl, propyl, isopropyl, tertbutyl, isobutyl, $C_{5-6}$cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It is appreciated that in the complexes, the metal ion M is coordinated by ligands X so as to satisfy the valency of the metal ion and to fill its available coordination sites. The nature of these σ-ligands can vary greatly.

Catalyst activity is defined in this application to be the amount of polymer produced/g catalyst/h. The term productivity is also sometimes used to indicate the catalyst activity although herein it designates the amount of polymer produced per unit weight of catalyst.

The single site catalyst is preferably a metallocene catalyst. The preparation of the metallocene catalyst can be carried out according to or analogously to the methods known from the literature and is within the skills of an art skilled person. Said metallocenes typically bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have the following formula:

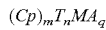

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR", —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

T is a bridge of 1-3 atoms, e.g. a bridge of 1-2 C-atoms or 1-2 heteroatoms, wherein the heteroatom(s) can be e.g. Si, Ge and/or O atom(s), whereby each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —SiR$^1$$_2$, wherein each R$^1$ is independently $C_1$-$C_{20}$-alkyl, $C_6$-$C_{20}$-aryl or tri($C_1$-$C_{20}$-alkyl)silyl-residue, such as a trimethylsilyl-residue.

M is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —CH$_2$—Y, wherein Y is $C_{6-20}$-aryl, $C_{6-20}$-heteroaryl, $C_{1-20}$-alkoxy, $C_{6-20}$-aryloxy, —NR"$_2$, —SiR"$_3$ or OSiR"3, —SR", —PR"$_3$, —SiR"$_3$, —OSiR"$_3$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

Each of the above mentioned ring moieties alone or as a part of a moiety as the substituent for Cp, A, R" or R<1>can further be substituted e.g. with C$_1$-C$_{20}$-alkyl which may contain Si and/or O atoms;

n is 1 or 2, e.g. 1, m is 1, 2 or 3, e.g. 1 or 2, q is 1, 2 or 3, e.g. 2 or 3, wherein m+q is equal to the valency of M.

Whilst therefore the invention is generally applicable to a stereospecific single site catalyst, the heterophasic polyproylene composition is preferably prepared in the presence of a metallocene of formula (I).

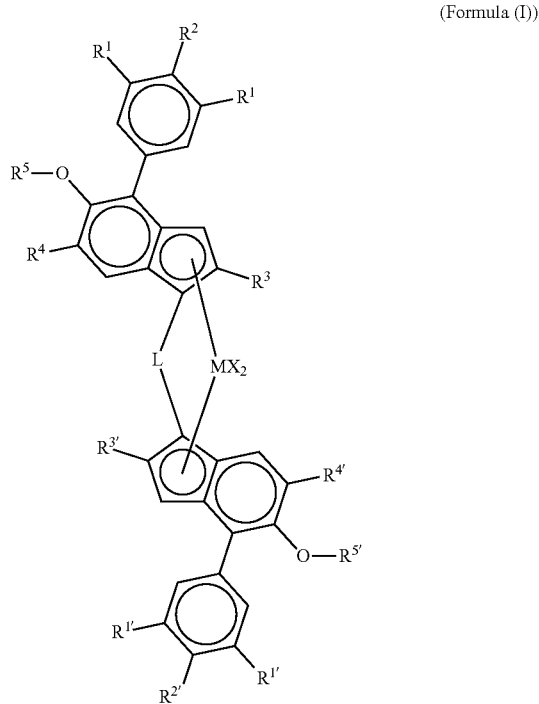

(Formula (I))

wherein

M is zirconium or hafnium;

each X independently is a sigma-donor ligand

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing one or more heteroatoms of Group 14-16 of the periodic table or fluorine atoms, or optionally two R' groups taken together can form a ring;

R$^1$ and R$^{1'}$ are each independently hydrogen, C$_5$-C$_{10}$-aryl or a group —CH(R$_x$)$_2$ wherein each R$^x$ is independently H or a C$_{1-10}$ hydrocarbyl group, and optionally the two R$^x$ taken together can form a ring, R$^2$ and R$^{2'}$ are each independently hydrogen, C$_5$-C$_{10}$-aryl or a group —C(R$^y$)$_3$ wherein each R$^y$ is independently H or a C$_{1-10}$ hydrocarbyl group, or optionally two or three R$^y$ groups taken together can form a ring, whereby at least one of R$^1$ or R$^2$ and one of R$^{1'}$ or R$^{2'}$ is different from hydrogen and whereby R$^2$ together with one of R$^1$, as well as R$^{2'}$ together with one of R$^{1'}$ can be part of a further mono- or multicyclic ring condensed to the phenyl ring R$^3$ and R$^{3'}$ are each independently a linear C$_1$ to C$_6$ hydrocarbyl group or a branched or cyclic C$_4$ to C$_{10}$ hydrocarbyl group, whereby the groups are not branched in α-position R$^4$ and R$^{4'}$ are each independently a tertiary C$_4$ to C$_{10}$ hydrocarbyl group R$^5$ and R$^{5'}$ are each independently a linear or branched C$_1$ to C$_{10}$ alkyl group or an C$_5$-C$_{10}$-aryl group and (ii) a cocatalyst comprising a compound of a group 13 metal.

The complexes can be asymmetrical or symmetrical. Asymmetrical means simply that the two indenyl ligands forming the metallocene are different, that is, each indenyl ligand bears a set of substituents that are either chemically different, or located in different positions with respect to the other indenyl ligand. Symmetrical complexes are based on two identical indenyl ligands.

Preferably the complexes used according to the invention are symmetrical.

The complexes are chiral, racemic bridged bisindenyl metallocenes. The metallocenes are either C$_2$-symmetric or C$_1$-symmetric. When they are C$_1$-symmetric they still maintain a pseudo-C$_2$-symmetry since they maintain C$_2$-symmetry in close proximity of the metal center, although not at the ligand periphery. By nature of their chemistry, both a meso form and a racemic enantiomer pair (in case of C$_2$-symmetric complexes) or anti and syn enantiomer pairs (in case of C$_1$-symmetric complexes) are formed during the synthesis of the complexes. In this context racemic or racemic-anti means that the two indenyl ligands are oriented in opposite directions with respect to the cyclopentadienyl-metal-cyclopentadienyl plane, while meso or racemic-syn means that the two indenyl ligands are oriented in the same direction with respect to the cyclopentadienyl-metal-cyclopentadienyl plane, as shown in the Figure below.

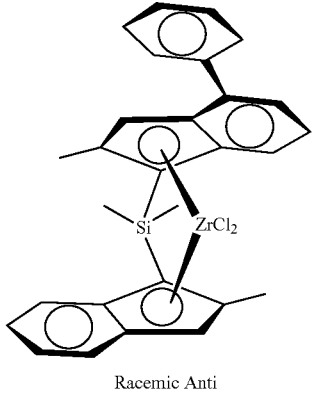

Racemic Anti

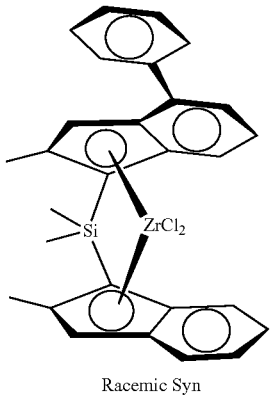

Racemic Syn

Formula (I) is intended to cover all these configurations.

It is preferred, if the metallocenes are employed as the racemic or racemic-anti isomers. Ideally therefore at least 95.0 mol %, such as at least 98.0 mol %, especially at least 99.0 mol % of the metallocene is in the racemic or racemic-anti isomeric form.

In the catalysts the following preferences apply:

M is zirconium or hafnium, preferably zirconium.

In the definitions below the term hydrocarbyl group includes alkyl groups, alkenyl groups, alkynyl groups, cycloalkyl groups, cycloalkenyl groups, aryl groups, alkylaryl groups or arylalkyl groups or of course mixtures of these groups such as cycloalkyl substituted by alkyl.

Each X independently is a sigma-donor ligand.

Thus each X may be the same or different, and is preferably a hydrogen atom, a halogen atom, a linear or branched, cyclic or acyclic $C_{1-20}$-alkyl or -alkoxy group, a $C_{6-20}$-aryl group, a $C_{7-20}$-alkylaryl group or a $C_{7-20}$-arylalkyl group; optionally containing optionally containing one or more heteroatoms of Group 14-16 of the periodic table.

The term halogen includes fluoro, chloro, bromo and iodo groups, preferably chloro groups.

The term heteroatoms belonging to groups 14-16 of the periodic table includes for example Si, N, O or S.

More preferably each X is independently a hydrogen atom, a halogen atom, a linear or branched $C_{1-6}$-alkyl or $C_{1-6}$-alkoxy group, a phenyl or benzyl group.

Yet more preferably each X is independently a halogen atom, a linear or branched $C_{1-4}$-alkyl or $C_{1-4}$-alkoxy group, a phenyl or benzyl group.

Most preferably each X is independently chlorine, benzyl or a methyl group.

Preferably both X groups are the same.

The most preferred options for both X groups are two chlorides, two methyl or two benzyl groups.

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, and optionally two R' groups taken together can form a ring. The term heteroatoms belonging to groups 14-16 of the periodic table includes for example Si, N, O or S.

Preferably L is dimethylsilyl, methylcyclohexylsilyl (i.e. Me—Si-cyclohexyl), ethylene or methylene.

$R^1$ and $R^{1'}$ are each independently hydrogen, $C_5$-$C_{10}$-aryl or a group —CH($R^x$)$_2$ wherein each $R^x$ is independently H or a $C_{1-10}$ hydrocarbyl group, and optionally the two $R^x$ taken together can form a ring, $R^2$ and $R^{2'}$ are each independently hydrogen, $C_5$-$C_{10}$-aryl or a group —C($R^y$)$_3$ wherein each $R^y$ is independently H or a $C_{1-10}$ hydrocarbyl group, or optionally two or three $R^y$ groups taken together can form a ring.

At least one of $R^1$ or $R^2$ and one of $R^{1'}$ or $R^{2'}$ is different from hydrogen. This means that the phenyl-groups in position 4 of both indenyl ligands are substituted by at least one substitutent different from hydrogen.

The phenyl-groups in position 4 of both indenyl ligands can therefore be substituted by one, two or three substitutents different from hydrogen.

In another embodiments $R^2$ together with one of $R^1$, as well as $R^{2'}$ together with one of $R^{1'}$ can be part of a further mono- or multicyclic ring condensed to the phenyl ring. The new ring is preferably 5 or 6 membered or the groups preferably form two new rings such as one further five membered and six membered ring.

The new ring or rings can be aliphatic or aromatic.

In this way groups such as 2-naphthyl, 5- or 6-(indanyl), 5- or 6-(1,1-dialkyl-1H-indenyl), 6-(1,2,3,4-tetrahydronaphthyl), 6-(1,1,4,4-tetramethyl-1,2,3,4-tetrahydronaphthyl), 5- or 6-(N-alkyl-indolyl), 5- or 6-(N-alkylindolinyl), 2- or 3-(N-alkylcarbazolyl), 5- or 6-benzothiophenyl can be formed.

Preferably $R^1$ and $R^{1'}$ are the same and are either hydrogen or group —CH($R^x$)$_2$ wherein each $R^x$ is independently either H or a $C_{1-3}$ hydrocarbyl group.

More preferably $R^1$ and $R^{1'}$ are either hydrogen or a group —CH($R^x$)$_2$ wherein each $R^x$ is H, i.e. the group being methyl.

Preferably $R^2$ and $R^{2'}$ are also the same and are either hydrogen or group —C($R^y$)$_3$ wherein each $R^y$ is either H or a $C_{1-3}$ hydrocarbyl group.

More preferably $R^2$ and $R^{2'}$ are either hydrogen or a group —C($R^y$)$_3$ wherein each $R^y$ is a $C_1$-alkyl group, i.e. the group being a tert-butyl group.

It is especially preferred that in the complex of the formula (I) either $R^1$ and $R^{1'}$ or $R^2$ and $R^{2'}$ are hydrogen.

In this case the phenyl-groups in position 4 of both indenyl ligands are both substituted either in position 4' of the phenyl groups or in position 3'and 5'of the phenyl groups.

It is within the scope of the invention for the two 4-phenyl groups to be different (e.g. 3,5-dimethylphenyl on one indene and 3,5-di-ethylphenyl on the other) or the same. Alternatively, the two 3,5-substituents on each 4-phenyl group can be different (e.g. 3-methyl-5-propyl) or the same.

It is preferred if the two 3,5-substituents on each phenyl group are the same. It is preferred if the two 4-position phenyl groups are the same. More preferably the 4-phenyl groups are the same on both ligands and that both 3,5-substituents are the same.

Even more preferred is that the phenyl-groups in position 4 of the indenyl ligands are either both a 3,5-dimethyl-phenyl (3,5-Me$_2$Ph) group or both are a 4-tert-butyl-phenyl (4-tBu-Ph) group.

$R^3$ and $R^{3'}$ are each independently a linear $C_1$ to $C_6$ hydrocarbyl group or a branched or cyclic $C_4$ to $C_{10}$ hydrocarbyl group, whereby the groups are not branched in α-position.

Suitable examples for linear $C_1$ to $C_6$ hydrocarbyl are alkyl groups like methyl, ethyl, n-propyl, n-butyl, n-propyl and n-hexyl.

Suitable examples for branched or cyclic $C_4$ to $C_{10}$ hydrocarbyl groups, which are not branched in a-position are benzyl, iso-butyl, isopentyl, isohexyl, 2-(cyclohexylmethyl), etc.

Preferably $R^3$ and $R^{3'}$ are a linear $C_1$ to $C_4$ alkyl group, more preferably a $C_1$ to $C_2$ alkyl group and even more preferably a methyl group.

$R^3$ and $R^{3'}$ may be the same or different, preferably they are the same.

$R^4$ and $R^{4'}$ are each independently a tertiary $C_4$ to $C_{10}$ hydrocarbyl group.

Suitable examples for tertiary $C_4$ to $C_{10}$ hydrocarbyl groups are tert-butyl, 1-adamantyl, 1,1-dimethylbenzyl, etc.

Preferably $R^4$ and $R^{4'}$ are a tertiary $C_4$ to $C_6$ alkyl group, more preferably a tert-butyl. $R^4$ and $R^{4'}$ may be the same or different, preferably they are the same.

$R^5$ and $R^{5'}$ are each independently a linear or branched $C_1$ to $C_{10}$ alkyl group or an $C_5$-$C_{10}$-aryl group.

Preferably $R^5$ and $R^{5'}$ are each independently a linear or branched $C_1$ to $C_6$ alkyl group or a phenyl group and more preferably a linear $C_1$ to $C_4$ alkyl group.

Even more oreferably $R^5$ and $R^{5'}$ are the same and most preferably $R^5$ and $R^{5'}$ are both methyl.

Particular compounds include:
rac-Me$_2$Si(2-Me-4-(3,5-Me$_2$Ph)-5-OMe-6-tBu-Ind)$_2$ZrCl$_2$ and
rac-Me$_2$Si(2-Me-4-(4-tBu-Ph)-5-OMe-6-tBu-Ind)$_2$ZrCl$_2$ Another suitable single site catalyst for polymerizing the heterophasic polypropylene composition of the present invention comprises (i) a metallocene of formula (II)

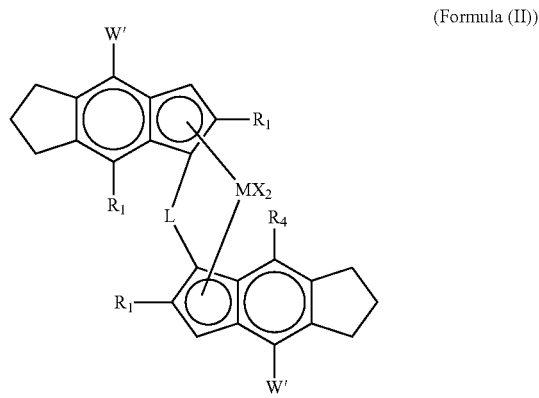

(Formula (II))

wherein
M is Zr or Hf;
each $R_1$ is a linear or branched $C_{1-10}$ alkyl;
L is ethylene or Si($R_6$)$_2$;
$R_6$ is $C_{1-10}$ alkyl, $C_{6-10}$-aryl, $C_{7-12}$-alkylaryl, or $C_{7-12}$-arylalkyl;
each X is a hydrogen atom, $C_{1-6}$-alkoxy, a halogen atom, or an R group;
R is $C_{1-10}$ alkyl
each $R_4$ is H or $C_{1-3}$-alkyl;
W' is phenyl, pyridyl, thiophenyl or furyl optionally substituted by up to 2 groups $R_5$;
each $R_5$ is $C_{1-10}$-alkyl or two adjacent $R_5$ groups taken together form a phenyl ring fused to W', and
(ii) at least an alumoxane or a compound able to form an alkylmetallocene cation.

Such structures are for example described in WO 2006/097497 or WO 2011/076780.

Post-Polymerization Treatment

After withdrawing the second polymerization mixture from the second polymerization reactor the second polymerization mixture is compounded to from the heterophasic polypropylene composition.

Thereby, the second polymerization mixture can be mixed with the additives as described above and optionally with other polymeric components.

Before compounding the second polymerization mixture can be treated with the usual post-polymerization treatments as known in the art such as catalyst deactivation, separation of reactants, post-polymerization reaction of the polymer such as vis-breaking or nucleation etc.

These post-polymerization treatments are well known to a person skilled in the art. Compounding can be conducted in mixers or extruder using suitable compounding conditions.

It is preferred that the heterophasic polypropylene composition is produced by compounding and pelletizing.

Article

The present invention is furthermore directed to an article comprising the heterophasic polypropylene composition as defined herein or the use of the heterophasic polypropylene composition as defined herein for the production of an article.

According to one embodiment of the invention, the heterophasic polypropylene composition as defined are used for the production of films, extruded, blow moulded or injection moulded articles, such as pouches and bags, flexible pipes and tubes, collapsible transport packaging containers as well as components for car exteriors and interiors, like elements of dashboards, door claddings, consoles and trims.

The article is preferably produced by any common conversion process suitable for thermoplastic polymers like injection moulding, extrusion blow moulding, injection stretch blow moulding or cast film extrusion.

EXAMPLES

1. Measurement Methods a) Melt Flow Rate (MFR$_2$)

The melt flow rate is the quantity of polymer in grams which the test apparatus standardized to ISO 1133 extrudes within 10 minutes at a certain temperature under a certain load.

The melt flow rate MFR$_2$ of the propylene polymer is measured at 230° C. with a load of 2.16 kg (MFR230/2.16) according to ISO 1133.

The melt flow rate MFR$_2$ of ethylene-based plastomer is measured at 190° C. with a load of 2.16 kg (MFR190/2.16) according to ISO 1133.

The melt flow rate MFR$_2$ of the polypropylene composition is measured at 230° C. with a load of 2.16 kg (MFR230/2.16) according to ISO 1133.

b) Density

The density is measured according to ISO 1183D. The samples preparation is carried out by compression moulding according to ISO 1872-2:2007.

c) Comonomer Content

Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}$C {$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probe head at 125° C. using nitrogen gas for all pneumatics.

Approximately 200 mg of material was dissolved in 3 ml of 1,2-tetrachloroethane-d$_2$ (TCE-d2) along with chromium-(III)-acetylacetonate (Cr(acac)$_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

Bibliographic References

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, $C_{29, 201}$.
11) Resconi, L., Cavallo, L., Fait, A., Piemontesi, F., Chem. Rev. 2000, 100, 1253.

d) Differential Scanning Calorimetry (DSC) Analysis, Melting Temperature (Tm) and Crystallization Temperature (Tc)

measured with a TA Instrument Q2000 differential scanning calorimetry (DSC) on 5 to 7 mg samples. DSC is run according to ISO 11357/part 3/method $C_2$ in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

e) Crystex C Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

A schematic representation of the CRYSTEX QC instrument is shown in FIG. 1a. The crystalline and amorphous fractions are separated through temperature cycles of dissolution at 160° C., crystallization at 40° C. and re-dissolution in 1,2,4-trichlorobenzene (1,2,4-TCB) at 160° C. as shown in FIG. 1b. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by $^{13}C$—NMR) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 Wt %.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800rpm.

As shown in a FIG. 1a and b, a defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt %] of the PP composition. During the second injection the soluble fraction (at low temperature) and the crystalline fraction (at high temperature) with the crystallization cycle are measured (Wt % SF, Wt % $C_2$, IV).

EP means ethylene propylene copolymer.
PP means polypropylene.

FIG. 1a shows a schematic diagram of the CRYSTEX QC instrument.

FIG. 1b shows an elution diagram of an exemplary ethylene-propylene copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene, The Column Advanstar Publications, February 2014. Pages 18-23).

f) Xylene Cold Solubles (XCS) Content is measured at 25° C. according to ISO 16152, first edition; 2005-07-01.

g) Intrinsic Viscosity (iV)

is measured according to DIN ISO 1628/1, October 1999 in decalin at 135° C.

h) Glass Transition Temperature (Tg), Storage Modulus (G')

The glass transition temperature $T_g$ and the storage modulus G' are determined by dynamic mechanical analysis (DMA) according to ISO 6721-7. The measurements are done in torsion mode on compression moulded samples (40×10×1 mm$^3$) between −100° C. and +150° C. with a heating rate of 2° C./min and a frequency of 1 Hz.

i) Molecular Weight Averages (Mw, Mn), Molecular Weight Distribution (MWD)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2× GMHXL-HT and 1× G7000HXL-HT TSK-gel columns from Tosoh Bioscience and 1,2,4-trichlorobenzene (TCB, stabilized with 250 mg/L 2,6-Di tert butyl-4-methylphenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

k) Flexural Modulus

The flexural modulus was determined according to ISO 178 at a test speed of 2 mm/min and a force of 100 N, whereby the length of the span between the supports was 64 mm, on test specimens having a dimension of 80×10×4 mm$^3$ (length×width×thickness) prepared by injection moulding according to EN ISO 1873-2.

l) Tensile Test

The tensile test (modulus, strength and extension at break) is measured at 23° C. according to ISO 527-1 (cross head speed 1 mm/min) using type 5A specimens according to ISO 527-2(1B), cut from compression moulded plaques of 2 mm thickness.)

m) Shore Hardness

The Shore A hardness and the Shore D hardness were determined according to ISO 868 on compression moulded plaques of 2 mm thickness, whereby the load was held constant for 15 sec.

2. Catalysts

MAO was purchased from Chemtura and used as a 30 wt-% solution in toluene. As surfactants were used 1H,1H-Perfluoro(2-methyl-3-oxahexan-1-ol) (CAS 26537-88-2) purchased from Unimatec, dried over activated molecular sieves (2 times) and degassed by argon bubbling prior to use (S2).

Hexadecafluoro-1,3-dimethylcyclohexane (PFC) (CAS number 335-27-3) was obtained from commercial sources and dried over activated molecular sieves (2 times) and degassed by argon bubbling prior to use. Propylene is provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes, needles or cannulas.

a) MC-1

Synthesis of Metallocene IC1

2-methyl-4-(4-tert-butylphenyl)-5-methoxy-6-tert-butyl-indan-1-one

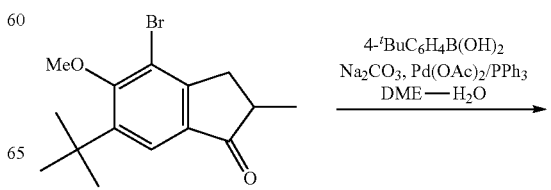

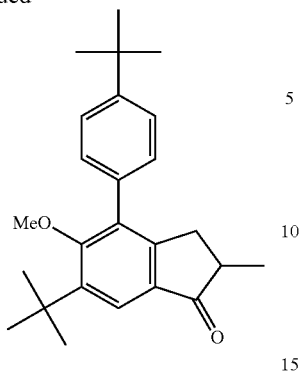

A mixture of 31.1 g (100 mmol) of 2-methyl-4-bromo-5-methoxy-6-tert-butyl-indan-1-one, 25.0 g (140 mmol) of 4-tert-butylphenylboronic acid, 29.4 g (280 mmol) of $Na_2CO_3$, 1.35 g (6.00 mmol, 6 mol. %) of $Pd(OAc)_2$, and 3.15 g (12.0 mmol, 12 mol. %) of $PPh_3$ in 130 ml of water and 380 ml of DME was refluxed for 6 h in argon atmosphere. The formed mixture was evaporated to dryness. To the residue 500 ml of dichloromethane and 500 ml of water were added. The organic layer was separated, the aqueous layer was additionally extracted with 100 ml of dichloromethane. The combined organic extract was dried over $Na_2SO_4$, evaporated to dryness, and the crude product was isolated using flash chromatography on silica gel 60 (40-63 μm; eluent: hexanes-dichloromethane=2:1, vol.). This crude product was recrystallized from n-hexane to give 29.1 g (81%) of a white solid.

Anal. calc. for $C_{25}H_{32}O_2$: C, 82.37; H, 8.85. Found: C, 82.26; H, 8.81.

$^1$H NMR ($CDCl_3$): δ7.74 (s, 1H, 7-H in indenyl), 7.48 (d, J=8.0 Hz, 2H, 2,6-H in $C_6H_4{}^tBu$), 7.33 (d, J=8.0 Hz, 2H, 3,5-H in $C_6H_4{}^tBu$), 3.27 (s, 3H, OMe), 3.15 (dd, J=17.3 Hz, J=7.7 Hz, 1H, 3-H in indan-1-on), 2.67-2.59 (m, 1H, 2-H in indan-1-on), 2.48 (dd, J=17.3 Hz, J=3.7 Hz, 3'-H in indan-1-on), 1.42 (s, 9H, $^tBu$ in $C_6H_4{}^tBu$), 1.38 (s, 9H, 6-$^tBu$ in indan-1-on), 1.25 (d, J=7.3 Hz, 3H, 2-Me in indan-1-one).

2- ethyl-5-tert-butyl-6-methoxy-7-(4-tert-butylphenyl)-1H-indene

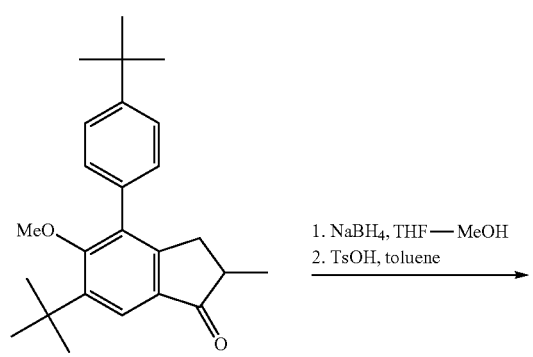

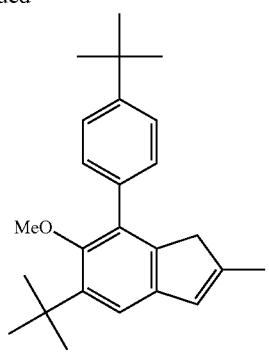

To a solution of 28.9 g (79.2 mmol) of 2-methyl-4-(4-tert-butylphenyl)-5-methoxy-6-tert-butyl-indan-1-one in 400 ml of THF cooled to 5° C. 5.00 g (132 mmol) of $NaBH_4$ was added. Further on, 100 ml of methanol was added dropwise to this mixture by vigorous stirring for ca. 7 h at 5° C. The resulting mixture was evaporated to dryness, and the residue wad partitioned between 500 ml of dichloromethane and 1000 ml of 0.5 M HCl. The organic layer was separated, the aqueous layer was additionally extracted with 100 ml of dichloromethane. The combined organic extract was evaporated to dryness to give a colorless oil. To a solution of this oil in 500 ml of toluene 1.0 g of TsOH was added. The formed mixture was refluxed with Dean-Stark head for 15 min and then cooled to room temperature using water bath. The resulting reddish solution was washed by 10% aqueous $Na_2CO_3$, the organic layer was separated, the aqueous layer was extracted with 2×100 ml of dichloromethane. The combined organic extract was dried over $K_2CO_3$ and then passed through short pad of silica gel 60 (40-63 μm). The silica gel pad was additionally washed with 50 ml of dichloromethane. The combined organic elute was evaporated to dryness to give a yellowish crystalline mass. The product was isolated by re-crystallization of this mass from 150 ml of hot n-hexane. Crystals precipitated at 5° C. were collected dried in vacuum. This procedure gave 23.8 g of white macrocrystalline 2-methyl-5-tert-butyl-6-methoxy-7-(4-tert-butylphenyl)-1H-indene. The mother liquor was evaporated to dryness and the residue was recrystallized from 20 ml of hot n-hexane in the same way. This procedure gave additional 2.28 g of the product. Thus, the total yield of the title product was 26.1 g (95%).

Anal. talc. for $C_{25}H_{32}O$: C, 86.15; H, 9.25. Found: C, 86.24; H, 9.40.

$^1$H NMR ($CDCl_3$): δ7.44 (d, J=8.5 Hz, 2H, 2,6-H in $C_6H_4{}^tBu$), 7.40 (d, J=8.5 Hz, 2H, 3,5-H in $C_6H_4{}^tBu$), 7.21 (s, 1H, 4-H in indenyl), 6.43 (m, 1H, 3-H in indenyl), 3.20 (s, 3H, OMe), 3.15 (s, 2H, 1-H in indenyl), 2.05 (s, 3H, 2-Me in indenyl), 1.43 (s, 9H, 5-$^tBu$ in indenyl), 1.37 (s, 9H, $^tBu$ in $C_6H_4{}^tBu$).

25

Bis[2-ethyl-4-(4-tert-butylphenyl)-5-methoxy-6-tert-butyl-1H-inden-1-yl]dimethylsilane

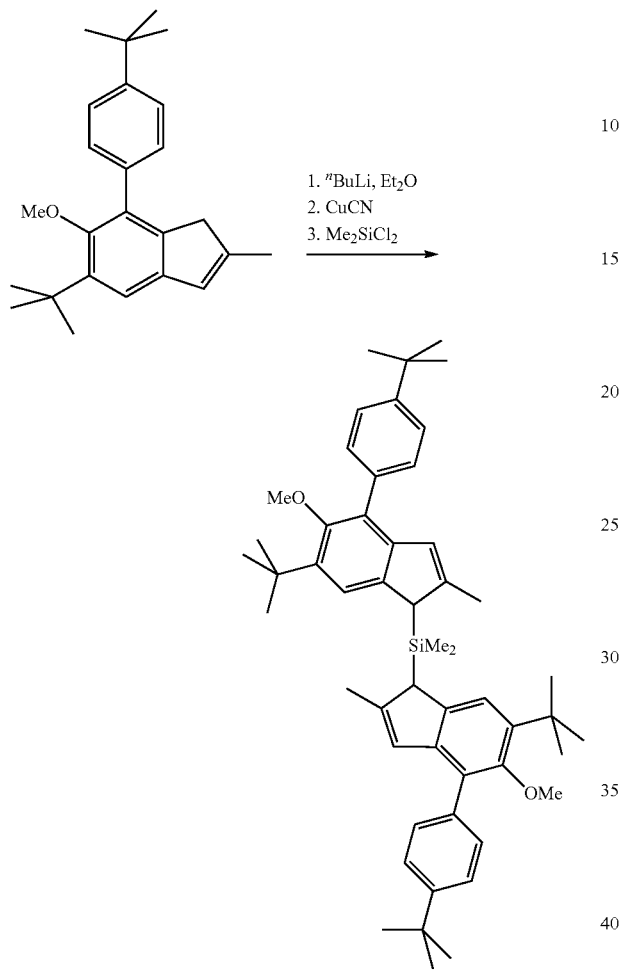

$^{13}$C{$^1$H} NMR (CDCl$_3$): δ155.50, 149.45, 147.55, 147.20, 143.70, 139.37, 137.09, 135.22, 135.19, 129.74, 127.26, 126.01, 125.94, 125.04, 120.58, 120.36, 60.48, 47.42, 47.16, 35.15, 34.56, 31.47, 31.27, 31.20, 17.75, −4.92, −5.22, −5.32.

Rac-dimethylsilanediyl-bis[2-methyl-4-(4-tert-butylphenyl)-5-methoxy-6-tert-butyl-inden-1-yl]zirconium dichloride

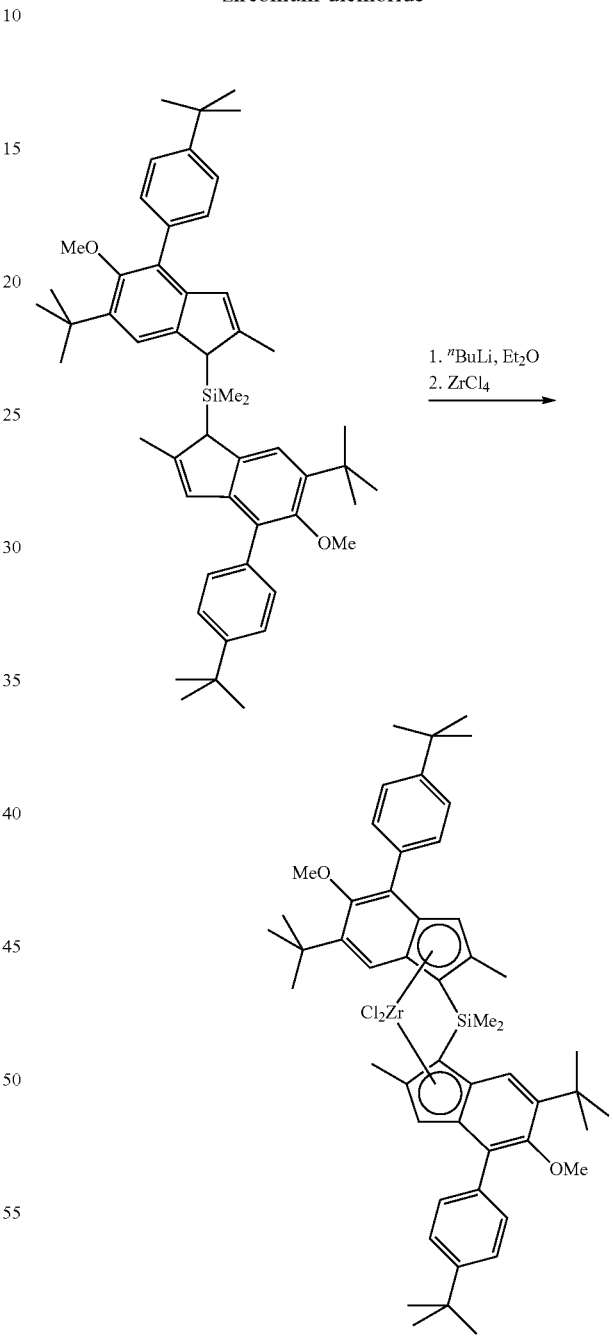

20.6 ml (50.06 mmol) of 2.43 M nBuLi in hexanes was added in one portion to a solution of 17.43 g (50.01 mmol) of 2-methyl-5-tert-butyl-7-(4-tert-butylphenyl)-6-methoxy-1H-indene in 300 ml of ether at −50° C. This mixture was stirred overnight at room temperature, then the resulting yellow solution with a lot of yellow precipitate was cooled to −60° C., and 225 mg of CuCN was added. The obtained mixture was stirred for 30 min at −25° C., and then 3.23 g (25.03 mmol) of dichlorodimethylsilane was added in one portion. Further on, this mixture was stirred overnight at ambient temperature. This solution was filtered through a pad of silica gel 60 (40-63 μm) which was additionally washed with 2×50 ml of dichloromethane. The combined filtrate was evaporated under reduced pressure, and the residue was dried in vacuum at elevated temperature. This procedure gave 18.76 g (ca. 100%, purity ca. 85%) of bis[2-methyl-4-(4-tert-butylphenyl)-5-methoxy-6-tert-butyl-1H-inden-1-yl]dimethylsilane (a ca. 7:3 mixture of diastereoisomers) as a white powder.

$^1$H NMR (CDCl$_3$): δ7.50-7.39 (m, 4H), 7.32 and 7.25 (2s, sum 1H), 6.48 and 6.46 (2s, sum 1H), 3.61 and 3.58 (2s, sum 1H), 3.21 (s, 3H), 2.12 and 2.06 (2s, sum 3H), 1.43, 1.42, 1.39 and 1.38 (4s, sum 18H), −0.18 and −0.19 (2s, sum 3H).

19.0 ml (46.17 mmol) of 2.43 M nBuLi in hexanes was added in one portion to a solution of 17.3 g (22.97 mmol) of bis[2-methyl-4-(4-tert-butylphenyl)-5-methoxy-6-tert-butyl-1H-inden-1-yl]dimethylsilane in 320 ml of ether cooled to −60° C. This mixture was stirred overnight at room temperature, then the resulting yellow solution with a lot of yellow precipitate was cooled to −60° C., and 5.36 g (23.0 mmol) of ZrCl$_4$ was added. The reaction mixture was stirred for 24 h at room temperature to give orange solution with a large amount of orange precipitate. This precipitate was filtered off (G4), heated with 300 ml of methylcyclohexane, and the formed suspension was filtered while hot from LiCl through glass frit (G4). Yellow powder precipitated overnight at room temperature from the filtrate was filtered off (G3) and then dried in vacuum. This procedure gave 3.98 g of rac-complex, contaminated with ca. 3% of meso-form. This mixture was dissolved in 40 ml of hot toluene, the formed solution was evaporated in vacuum to ca. 10 ml. Yellow powder precipitated at room temperature was filtered off (G3) and then dried in vacuum to give 3.41 g (16%) of pure rac-dimethylsilanediyl-bis[2-methyl-4-(4-tert-butylphenyl)-5-methoxy-6-tert-butyl-inden-1-yl]zirconium dichloride (content of meso-form <1%). The ether mother liquor was evaporated to dryness, and the residue was dissolved in 100 ml of warm toluene. This solution was filtered through glass frit (G4), and the obtained filtrate was evaporated to ca. 40 ml. Yellow powder precipitated from this solution at room temperature was immediately filtered off and dried in vacuum to give 2.6 g of a ca. 5 to 1 mixture of rac- and meso-zirconocenes (in favor to rac-). All mother liquors were combined, evaporated to a volume ca. 20 ml, and the residue was triturated with 100 ml of n-hexane. The formed orange powder was collected and dried in vacuum. This procedure gave 5.8 g of a mixture of rac- and meso-zirconocenes. Thus, the total yield of rac- and meso-zirconocenes isolated in this synthesis was 11.81 g (56%).

Rac-dimethylsilanediyl-bis[2-methyl-4-(4-tert-butylphenyl)-5-methoxy-6-tert-butyl-inden-1-yl]zirconium dichloride Anal. calc. for C$_{52}$H$_{66}$Cl$_2$O$_2$SiZr: C, 68.39; H, 7.28. Found: C, 68.70; H, 7.43.

$^1$H NMR (CDCl$_3$): δ7.63-7.52 (m, 2H), 7.50 (s, 1H), 7.44 (d, J=8.1 Hz, 2H), 6.63 (s, 1H), 3.39 (s, 3H), 2.16 (s, 3H), 1.38 (s, 9H), 1.33 (s, 9H), 1.29 (s, 3H).

$^{13}$C{1H} NMR (CDCl$_3$): δ160.00, 150.16, 144.25, 135.07, 133.79, 133.70, 129.25, 127.08, 125.39, 123.09, 121.32, 120.81, 81.57, 62.61, 35.78, 34.61, 31.39, 30.33, 18.37, 2.41

Preparation of Catalyst MC-1

Inside the glovebox, 86.4 mg of dry and degassed Surfactant S2 were mixed with 2 mL of 30 wt % Chemtura MAO in a septum bottle and left to react overnight. The following day, 69.3 mg of metallocene IC1 (0.076 mmol, 1 equivalent) were dissolved with 4 mL of the 30 wt.-% Chemtura MAO solution in another septum bottle and left under stirring inside the glovebox. After 60 minutes, 1 mL of the MAO/surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100mL of hot PFC at 90° C., and stirred at 600 rpm until the transfer is completed, and then the speed was reduced to 300 rpm. After 15 minutes stirring, the oil bath was removed and the stirrer turned off The catalyst was left to settle up on top of the PFC and after 35 minutes the solvent was siphoned off The remaining catalyst was dried during 2 hours at 50° C. over an argon flow. 0.75 g of a red free flowing powder was obtained.

b) MC-2

Synthesis of Metallocene IC2

(3,5-Dimethylphenyl) Boronic Acid

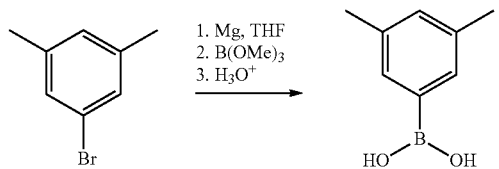

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over Na$_2$SO$_4$ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid.

Anal. calc. for C$_8$H$_{11}$BO$_2$: C, 64.06; H, 7.39. Found: C, 64.38; H, 7.72.

$^1$H NMR (DMSO-d$_6$): δ7.38 (s, 2H), 7.00 (s, 1H), 3.44 (very br.s, 2H), 2.24 (s, 6H).

6-tert-Butyl-4-(3,5-dimethylphenyl)-5-methoxy-2-methylindan-1-one

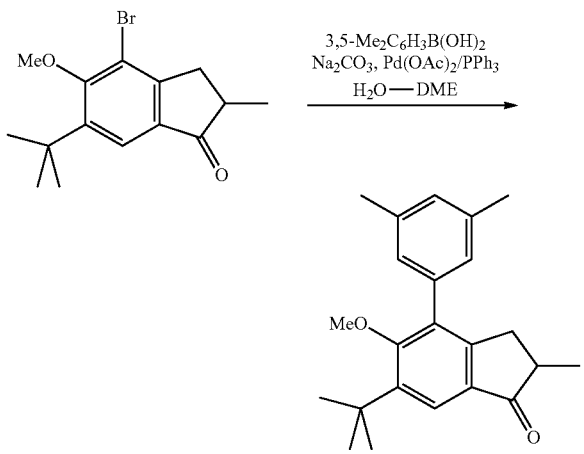

A mixture of 49.14 g (157.9 mmol) of 4-bromo-6-tert-butyl-5-methoxy-2-methylindan-1-one, 29.6 g (197.4 mmol, 1.25 eq.) of (3,5-dimethylphenyl)boronic acid, 45.2 g (427 mmol) of Na₂CO₃, 1.87 g (8.3 mmol, 5 mol. %) of Pd(OAc)₂ 4.36 g (16.6 mmol, 10 mol. %) of PPh₃, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over K₂CO₃ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 6-tert-butyl-4-(3,5-dimethylphenyl)-5-methoxy-2-methylindan-1-one as a brownish oil.

Anal. calc. for $C_{23}H_{28}O_2$: C, 82.10; H, 8.39. Found: C, 82.39; H, 8.52.

¹H NMR (CDCl₃): δ7.73 (s, 1H), 7.02 (s, 1H), 7.01 (s, 2H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz), 2.36 (s, 6H), 1.42 (s, 9H), 1.25 (d, J=7.5 Hz, 3H).

¹³C{¹H} NMR (CDCl₃): δ208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

5-tert-Butyl-7-(3,5-dimethylphenyl)-6-methoxy-2-methyl-1-indene

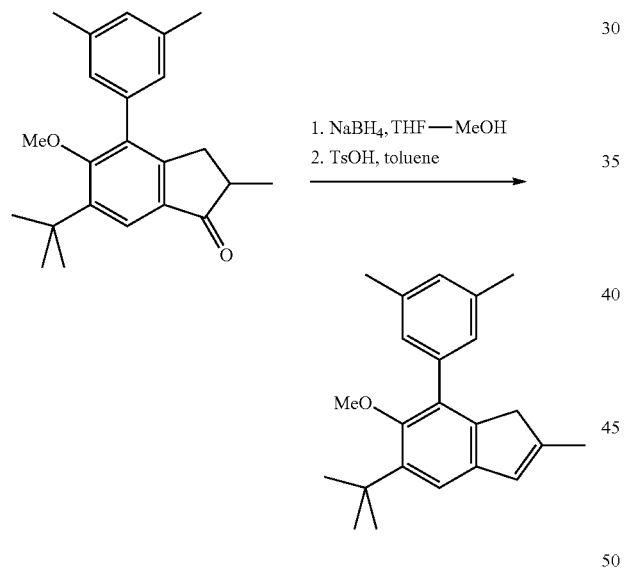

8.2 g (217 mmol) of NaBH₄ was added to a solution of 48.43 g (143.9 mmol) of 6-tert-butyl-4-(3,5-dimethylphenyl)-5-methoxy-2-methylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% Na₂CO₃, the organic layer was separated, the aqueous layer was extracted with 150 ml of dichloromethane. The combined organic extract was dried over K₂CO₃ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 5-tert-butyl-7-(3,5-dimethylphenyl)-6-methoxy-2-methyl-1H-indene which was further used without additional purification.

Anal. calc. for $C_{23}H_{28}O$: C, 86.20; H, 8.81. Found: C, 86.29; H, 9.07.

¹H NMR (CDCl₃): δ7.20 (s, 1H), 7.08 (br.s, 2H), 6.98 (br.s, 1H), 6.42 (m, 1H), 3.25 (s, 3H), 3.11 (s, 2H), 2.36 (s, 6H), 2.06 (s, 3H), 1.43 (s, 9H).

¹³C{¹H} NMR (CDCl₃): δ154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

Bis[6-tert-butyl-4-(3,5-dimethylphenyl)-5-methoxy-2-methyl-1H-inden-1-yl]dimethylsilane

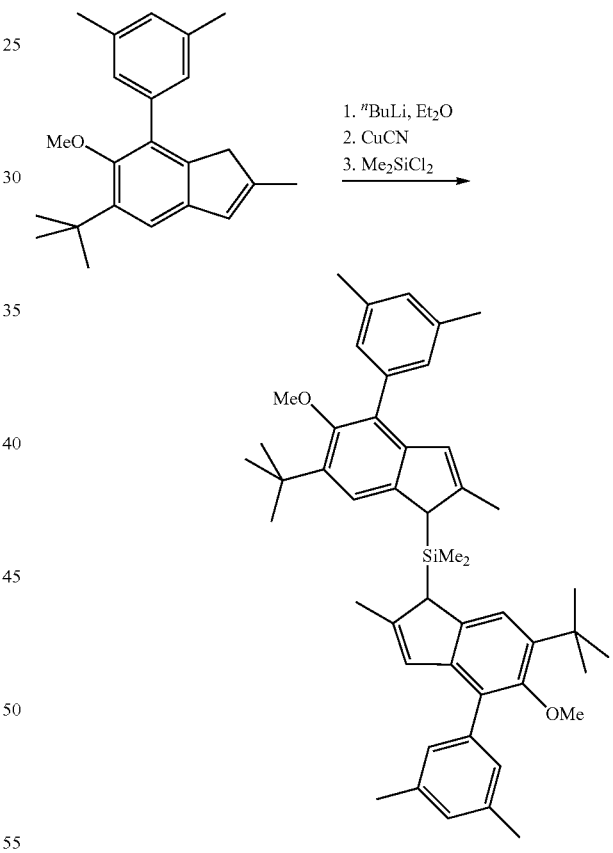

28.0 ml (70 mmol) of 2.5 M ⁿBuLi in hexanes was added in one portion to a solution of 22.36 g (69.77 mmol) of 5-tert-butyl-7-(3,5-dimethylphenyl)-6-methoxy-2-methyl-1H-indene in 350 ml of ether at −50° C. This mixture was stirred overnight at room temperature, then the resulting orange solution with a large amount of yellow precipitate was cooled to −60° C. (at this temperature the precipitate almost completely disappeared), and 400 mg of CuCN was added. The resulting mixture was stirred for 30 min at −25° C., and then 4.51 g (34.95 mmol) of dichlorodimethylsilane was added in one portion. This mixture was stirred overnight at room temperature, then filtered through a pad of silica gel 60 (40-63 μm) which was additionally washed by 2×50 ml of dichloromethane. The combined filtrate was evaporated under reduced pressure, and the residue was dried in vacuum at elevated temperature. This procedure gave 24.1 g (99%) of bis[6-tert-butyl-4-(3,5-dimethylphenyl)-5-methoxy-2-methyl-1H-inden-1-yl]dimethylsilane (>90% purity by NMR, approx. 3:1 mixture of stereoisomers) as a yellowish glass which was further used without additional purification.

$^1$H NMR (CDCl$_3$): δ7.49, 7.32, 7.23, 7.11, 6.99 (5s, sum 8H), 6.44 and 6.43 (2s, sum 2H), 3.67, 3.55 (2s, sum 2H), 3.27, 3.26 (2s, sum 6H), 2.38 (s, 12H), 2.13 (s, 6H), 1.43 (s, 18H), −0.13, −0.18, −0.24 (3s, sum 6H).

$^{13}$C{$^1$H} NMR (CDCl$_3$): δ155.29, 147.57, 147.23, 143.63, 139.37, 139.26, 138.19, 137.51, 137.03, 128.24, 127.90, 127.47, 126.01, 125.89, 120.53, 120.34, 60.51, 47.35, 47.16, 35.14, 31.28, 31.20, 21.44, 17.94, 17.79, −4.84, −4.89, −5.84.

Rac-dimethylsilanediyl-bis[2-methyl-4-(3,5-dimethylphenyl)-5-methoxy-6-tert-butyl-inden-1-yl]zirconium dichloride (IE2)

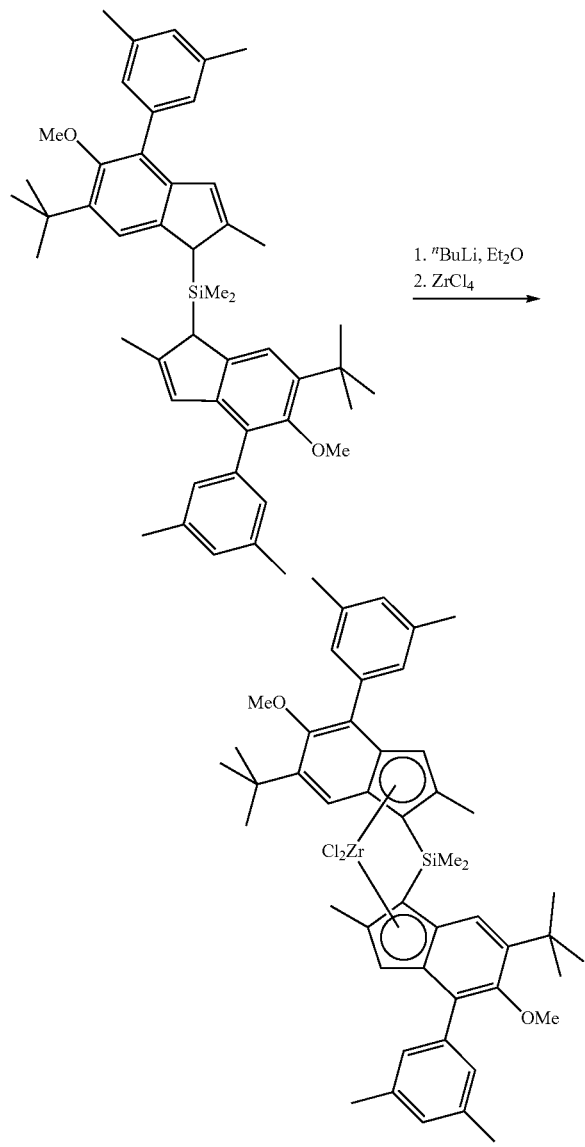

27.7 ml (69.3 mmol) of 2.5 M $^n$BuLi in hexanes was added in one portion to a solution of 24.1 g (34.53 mmol) of bis[6-tert-butyl-4-(3,5-dimethylphenyl)-5-methoxy-2-methyl-1H-inden-1-yl]dimethylsilane (prepared above) in 350 ml of diethyl ether cooled to −50° C. This mixture was stirred overnight at room temperature, then the resulting yellow solution with a large amount of yellow precipitate was cooled to −50° C., and 8.05 g (34.54 mmol) of ZrCl$_4$ was added. The reaction mixture was stirred for 24 h at room temperature to give a reddish-orange solution containing some precipitate. This mixture was evaporated to dryness. The residue was heated with 200 ml of toluene, and the formed suspension was filtered while hot through a glass frit (G4). The filtrate was evaporated to 70 ml, and then 50 ml of hexane was added. Crystals precipitated from this solution overnight at room temperature were collected, washed with 25 ml of hexane, and dried in vacuo. This procedure gave 4.01 g of pure rac-zirconocene. The mother liquor was evaporated to ca. 50 ml, and 50 ml of hexane was added. Orange crystals precipitated from this solution overnight at room temperature were collected and then dried in vacuum.

This procedure gave 2.98 g of rac-zirconocene. Again, the mother liquor was evaporated almost to dryness, and 50 ml of hexane was added. Orange crystals precipitated from this solution overnight at −30° C. were collected and dried in vacuum. This procedure gave 3.14 g of rac-zirconocene. Thus, the total yield of rac-zirconocene isolated in this synthesis was 10.13 g (34%).

Rac-IC2

Anal. calc. for C$_{48}$H$_{58}$Cl$_2$O$_2$SiZr: C, 67.26; H, 6.82. Found: C, 67.42; H, 6.99.

$^1$H NMR (CDCl$_3$): δ7.49 (s, 1H), 7.23 (very br.s, 2H), 6.96 (s, 1H), 6.57 (s, 1H), 3.44 (s,3H), 2.35 (s, 6H), 2.15 (s, 3H), 1.38 (s, 9H), 1.27 (s, 3H).

$^{13}$C{$^1$H} NMR (CDCl$_3$): δ159.78, 144.04, 137.87, 136.85, 134.89, 133.86, 128.85, 127.39, 127.05, 122.91, 121.18, 120.80, 81.85, 62.66, 35.76, 30.38, 21.48, 18.35, 2.41.

Preparation of Catalyst C-2

Inside the glovebox, 86.2 mg of dry and degassed surfactant (S2) were mixed with 2 mL of 30 wt % Chemtura MAO in a septum bottle and left to react overnight. The following day, 65.1 mg of metallocene IC2 (0.076 mmol, 1 equivalent) were dissolved with 4 mL of the 30 wt % Chemtura MAO solution in another septum bottle and left under stirring inside the glovebox. After 60 minutes, 1 mL of the MAO/surfactant solution and the 4 mL of the MAO-metallocene solution were successively added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off The catalyst was left to settle up on top of the PFC and after 35 minutes the solvent was siphoned off. The remaining catalyst was dried during 2 hours at 50° C. over an argon flow. 0.79 g of a red free flowing powder was obtained.

c) MC-3

Synthesis of Metallocene IC3

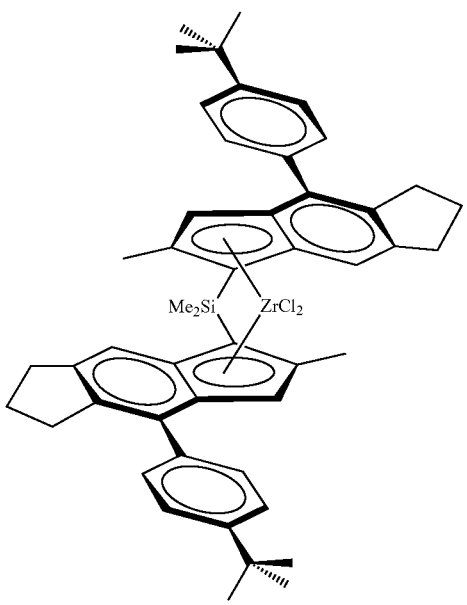

(rac-μ-{bis-[η⁵-2-methyl-4-(4-tert-butylphenyl)-1,5,6,7-tetrahydro-s-indacen-1-yl]dimethylsilanediyl}dichlorozirconium) was prepared as described in WO2006/097497A1.

The ¹H NMR spectrum of it corresponds to that reported in the mentioned patent application.

Preparation of Catalyst MC-3

Inside the glovebox, 85.7 mg of dry and degassed surfactant S2 were mixed with 2 mL of 30 wt.-% Chemtura MAO in a septum bottle and left to react overnight. The following day, 38.0 mg of Metallocene IC-3 (0.051 mmol, 1 equivalent) were dissolved with 4 mL of the 30 wt.-% Chemtura MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off The catalyst was left to settle up on top of the PFC and after 35 minutes the solvent was siphoned off The remaining catalyst was dried during 2 hours at 50° C. over an argon flow. 0.66 g of a red free flowing powder was obtained.

d) C-4

Synthesis of a Metallocene IC-4

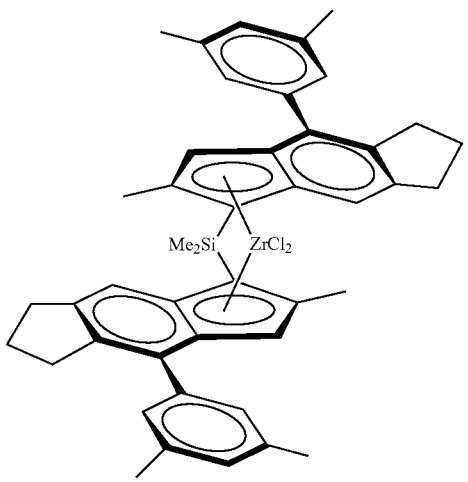

was prepared analogously to metallocene IC-3.

Preparation of Catalyst C-4

Inside the glovebox, 85.7 mg of dry and degassed surfactant S2 were mixed with 2 mL of 30 wt.-% Chemtura MAO in a septum bottle and left to react overnight, The following day, 58.1 mg of Metallocene IC-4 (0.051 mmol, 1 equivalent) were dissolved with 4 mL of the 30 wt.-% Chemtura MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.60 g of a red free flowing powder was obtained.

3. Off-Line Prepolymerization Procedure

Off-line prepolymerized catalysts were off-line prepolymerized according to the following procedure:

The catalysts were pre-polymerized according to the following procedure: Off-line prepolymerization experiment was done in a 125 mL pressure reactor equipped with gas feeding lines and an overhead stirrer. Dry and degassed perfluoro-1.3-dimethylcyclohexane (15 cm³) and the desired amount of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached. The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

TABLE 1

Off-line prepolymerization

| Example | Catalyst | Metallocene | Catalyst amount (mg) | Yield (g) |
|---|---|---|---|---|
| IE1 | MC-1 | IC-1 | 402.7 | 1.8258 |
| IE2 | MC-2 | IC-2 | 408.5 | 1.7145 |
| IE3 | MC-3 | IC-3 | 398.7 | 1.8057 |
| IE4 | MC-4 | IC-4 | 393.3 | 1.6514 |
| CE5 + CE6 | MC-5 | IC-2 | 408.5 | 1.7145 |

4. Preparation of the Examples a) Inventive Examples 1E1-4

The heterophasic propylene copolymers of inventive examples IE1-IE4 have been polymerized in a 20-L reactor following the procedures as follows:

Step 1: Prepolymerization and Bulk Homopolymerization

A 20 L stainless-steel reactor containing 0.4 barg propylene was filled with 4430 g propylene. Triethylaluminum (1.6 ml of a 0.6 mol/l solution in heptane) was injected into the reactor by additional 240 g propylene. The solution was stirred at 20° C. and 250 rpm for at least 20 min. The catalyst was injected as described in the following. The desired amount of solid, prepolymerized catalyst was loaded into a 5 ml stainless steel vial inside a glovebox and a second 5 ml vial containing 4 ml n-heptane pressurized with 10 bars of nitrogen was added on top of the first vial. This catalyst feeder system was mounted on a port on top of the autoclave. The valve between the two vials was opened and the solid catalyst was contacted with heptane under nitrogen pressure for 2 s, then flushed into the reactor with 240 g propylene. The prepolymerization was run for 10 min. At the end of the prepolymerization step the temperature was raised to 80° C. When the internal reactor temperature has reached 71° C., 1.5 NL $H_2$ was added via mass flow controller in one minute. The reactor temperature was held constant at 80° C. throughout the polymerization. The polymerization time of 37 min was measured starting when the internal reactor temperature reached 2° C. below the set polymerization temperature.

Step 2: Gas Phase Ethylene-Propylene Copolymerization

After the bulk step was completed, the stirrer speed was reduced to 50 rpm and the pressure was reduced down to 0.3 bar-g by venting the monomers. Then triethylaluminum (0.80 ml of a 0.62 mol/l solution in heptane) was injected into the reactor by additional 250 g propylene through a steel vial. The pressure was then again reduced down to 0.3 bar-g by venting the monomers. The stirrer speed was set to 180 rpm and the reactor temperature was set to 70° C. Then the reactor pressure was increased to 20 bar-g by feeding a C3/C2 gas mixture with a C2/C3 feed of 0.25 wt/wt. The temperature was held constant by thermostat and the pressure was held constant by feeding via mass flow controller a C2/C3 gas mixture of composition corresponding to the target polymer composition and, until the set time for this step of 67 min had expired.

Then the reactor was cooled down to about 30° C. and the volatile components flashed out. After flushing the reactor 3 times with $N_2$ and one vacuum/$N_2$ cycle, the product was taken out and dried overnight in a fume hood. 100 g of the polymer is additivated with Irganox B225 (solution in acetone, supplier: BASF SE), Calcium stearate (Cas No 1592-23-0, supplier Faci) and Irgastab FS 042 (supplier. BASF SE) in the amounts as shown in Table 2 below and dried overnight in a hood followed by 2 hours in a vacuum drying oven at 60° C.

TABLE 2

Compositions of inventive examples IE1-4

| Component | IE1 | IE2 | IE3 | IE4 |
|---|---|---|---|---|
| Polymer [wt %] | 99.8 | 99.8 | 99.8 | 99.8 |
| Irganox B225 [wt %] | 0.10 | 0.15 | 0.15 | 0.15 |
| Ca stearate [wt %] | 0.05 | 0.05 | 0.05 | 0.05 |
| Irgastab FS042 [wt %] | 0.05 | — | — | — | b) Comparative Examples CE5-6

The propylene homopolymers of comparative examples CE5 and CE6 have been polymerized in a 20-L reactor following the procedures as follows:

Step 1: Prepolymerization and Bulk Homopolymerization

A 20 L stainless-steel reactor containing 0.4 barg propylene was filled with 4455 g propylene. Triethylaluminum (0.8 ml of a 0.62 mol/l solution in heptane) was injected into the reactor by additional 250 g propylene. The solution was stirred at 20° C. and 250 rpm for at least 20 min. The catalyst was injected as described in the following. The desired amount of solid, prepolymerized catalyst was loaded into a 5 ml stainless steel vial inside a glovebox and a second 5 ml vial containing 4 ml n-heptane pressurized with 10 bars of nitrogen was added on top of the first vial. This catalyst feeder system was mounted on a port on top of the autoclave. The valve between the two vials was opened and the solid catalyst was contacted with heptane under nitrogen pressure for 2 s, then flushed into the reactor with 250 g propylene. The prepolymerization was run for 10 min. At the end of the prepolymerization step the temperature was raised to 80° C. When the internal reactor temperature has reached 71° C., 2.0 NL $H_2$ was added via mass flow controller in one minute. The reactor temperature was held constant at 80° C. throughout the polymerization. The polymerization time of 20 min was measured starting when the internal reactor temperature reached 2° C. below the set polymerization temperature.

Step 2: Gas Phase Homopolymerization

After the bulk step was completed, the stirrer speed was reduced to 50 rpm and the pressure was reduced to 23 bar-g by venting the monomer. Afterwards the stirrer speed was set to 180 rpm, the reactor temperature to 80° C. and the pressure to 35.7 bar-g. 1.5 NL Hydrogen was added via flow controller in one minute. During the gas phase homopolymerization, both pressure and temperature have been held constant via mass flow controller (feeding propylene) and thermostat for 40 minutes.

Then the reactor was cooled down to about 30° C. and the volatile components flashed out. After flushing the reactor 3 times with $N_2$ and one vacuum/$N_2$ cycle, the product was taken out and dried overnight in a fume hood. 45 g of the propylene homopolymer is compounded with 55 g of Queo 8201 or Vistamaxx 6102 as shown in Table 2 below to form heterophasic polypropylene compositions and dried overnight in a hood followed by 2 hours in a vacuum drying oven at 60° C.

Queo™ 8201 is an ethylene based octene-1 plastomer produced in a solution polymerization process using a metallocene catalyst with a $MFR_2$ (2.16 kg, 190° C.) of 1.1 g/10 min and a density of 883 kg/m³ and is commercially available from Borealis AG, Austria.

Vistamaxx™ 6102 is a propylene based ethylene plastomer produced a solution polymerization process using a metallocene catalyst with a $MFR_2$ (2.16 kg, 230° C.) of 1.4 g/10 min and a density of 862 kg/m³ and is commercially available from Exxon Mobil, USA.

Compounding of the comparative examples was done in a PRISM TSE16 twin screw extruder at 200-220° C. followed by solidifying the melt strand in a water bath and strand pelletization.

TABLE 3

Composition of Comparative examples CE5-6

|  | CE5 | CE6 |
|---|---|---|
| Propylene homopolymer [wt %] | 45 | 45 |
| Queo 8201 [wt %] | 55 | — |
| Vistamaxx 6102 [wt %] | — | 55 |

5. Properties of the Compositions of the Examples

The examples IE1-4 and CE5-6 have the following properties as listed in Table 4.

TABLE 4

Properties of examples IE1-4 and CE5-6

|  | unit | IE1 | IE2 | IE3 | IE4 | CE5 | CE6 |
|---|---|---|---|---|---|---|---|
| CRYSTAF Crystalline Fraction (CF) | | | | | | | |
| Amount in composition | wt % | 39 | 43 | 37 | 51 | 45 | 51 |
| Ethylene content | wt % | 0.92 | 1.1 | 1.3 | 1.1 | 4.3 | 1.8 |
| iV | dl/g | 2.2 | 2.2 | 1.6 | 3.5 | 2.7 | 2.6 |
| CRYSTAF Soluble Fraction (SF) | | | | | | | |
| Amount in composition | wt % | 61 | 57 | 63 | 49 | 55 | 49 |
| Ethylene content | wt % | 24.2 | 24.0 | 26.5 | 49.9 | 87.6 | 16.7 |
| iV | dl/g | 3.0 | 2.3 | 2.1 | 3.0 | 1.8 | 2.2 |
| Xylene Cold Soluble Fraction (XCS) | | | | | | | |
| Amount in composition | wt % | 56 | 54 | 64 | 52 | 53 | 55 |
| iV | dl/g | 3.83 | 3.00 | 1.86 | 1.56 | 2.8 | 2.9 |
| Mw | kg/mol | 404 | 357 | 242 | 157 | n.d | n.d |
| Mn | kg/mol | 138 | 122 | 91 | 49 | n.d. | n.d. |
| Xylene Cold Insoluble Phase (XCI) | | | | | | | |
| Ethylene content | wt % | 2.7 | 2.5 | .n.d | 1.0 | n.d. | n.d |
| Composition | | | | | | | |
| $MFR_2$ | g/10 min | 0.96 | 1.9 | 4.1 | 0.17 | 2.0 | 2.2 |
| Ethylene content | wt % | 14.0 | 13.1 | 16.4 | 23.4 | 48.2 | 8.6 |
| iV | dl/g | 2.7 | 2.3 | 1.9 | 3.4 | 2.2 | 2.4 |
| Tg1 | ° C. | −34 | −36 | −34 | −5 | −40 | −29 |
| Tg2 | ° C. | 1 | 1 | 0 | 2 | −5 | −2 |
| G' (23° C.) | MPa | 82 | 160 | 42 | 182 | 114 | 148' |
| Tm | ° C. | 149 | 150 | 154 | 154 | 152 | 152 |
| Shore A hardness |  | 91 | 95 | 66 | 98 | 99 | 99 |
| Shore D hardness |  | 27 | 34 | 12 | 37 | 51 | 46 |
| Tensile modulus | MPa | 128 | 257 | 15 | 392 | 330 | 323 | n.d. not determined

The following resins used as Reference Examples RE7-RE11 are state of the art soft propylene based thermoplastic polyolefins (TPOs) manufactured in the presence of a Ziegler-Natta catalyst using the LyondellBasell's proprietary Catalloy process and are all commercially available from LyondellBasell, Italy, under the tradename Adflex.

Additionally, as Reference example RE12 a heterophasic propylene copolymer resin with a random ethylene-propylene copolymer matrix phase and an ethylene-propylene elastomeric phase was produced in accordance with example E1 of WO 2014/075973 A1 in the presence of a Ziegler-Natta catalyst. For RE12 in addition to the flexural modulus a tensile modulus (TM) of 484 MPa was determined.

The properties of these resins are listed in the following in Table 5

TABLE 5

Properties of Reference Examples RE7-11

| Resin | | MFR$_2$ g/10 min | XCS wt % | iV (XCS) dl/g | Flexural modulus [MPa] | Shore D hardness |
|---|---|---|---|---|---|---|
| RE7 | Q100F | 0.6 | 64.8 | 3.8 | 100 | 30 |
| RE8 | Q401F | 0.65 | n.d. | n.d. | 480 | 49 |
| RE9 | Q200F | 0.8 | 51.9 | 2.6 | 150 | 49 |
| RE10 | KS021P | 0.9 | n.d. | n.d. | 350 | 38 |
| RE11 | X500F | 7.5 | 21.9 | 1.50 | 550 | 46 |
| RE12 | E1 of WO2014/ 075973 | 1.7 | 33.6 | 1.8 | 470 484 (TM) | 54 | n.d. not determined

It can be seen from the above listed properties in Tables 4 and 5 that the heterophasic polypropylene compositions according to the present invention (IE1-4) show an improved softness compared to heterophasic polypropylene compositions of Comparative Examples CE5-6, Reference Examples RE7-11 and Reference Example RE12. This can be seen in that the compositions of the inventive examples show a lower Shore D hardness at the same tensile modulus (flexural modulus for RE7-1 1). In comparison of Reference example RE12 the compositions of the inventive examples show a lower Shore D hardness together with a lower tensile modulus.

FIG. 2 illustrates said improved softness in a modulus to Shore D hardness graph.

Thereby, for examples IE1-4 and CE5-6 the tensile modulus is shown and for examples RE7-11 the flexural modulus is shown.

Thereby, the diamond shaped dots show the tensile modulus—Shore D hardness-relation of the inventive examples IE1-4. The square shaped dots show the tensile modulus—Shore D hardness-relation of the comparative examples CE5-6. The triangle shaped dots show the flexural modulus—Shore D hardness-relation of the reference examples RE7-11.

The invention claimed is:

1. A heterophasic polypropylene composition comprising a polymer base resin which comprises a matrix phase and an elastomeric phase dispersed therein, wherein the matrix phase and the elastomeric phase are polymerized in the presence of a single-site catalyst; and
   wherein the polymer base resin comprises:
   (A) from 20 to 55 wt % of a crystalline fraction (CF), measured by Crystex QC in trichlorobenzene, which is a propylene homopolymer fraction or a copolymer fraction of propylene monomer units and comonomer units of ethylene or alpha-olefins with 4 to 12 carbon atoms with an amount of comonomer units of up to 6.0 wt %; and
   (B) from 45 to 80 wt % of a soluble fraction (SF), measured by Crystex QC in trichlorobenzene, which is a copolymer of propylene monomer units and comonomer units of ethylene or alpha-olefins with 4-12 carbon atoms, with an amount of comonomer units of from 17 to 55 wt % and an intrinsic viscosity iV of from 1.2 to 7.0 dl/g,
   wherein the heterophasic polypropylene composition has a tensile modulus of not more than 700 MPa and a total viscosity iV of from 1.2 to 7.0 dl/g.

2. The heterophasic polypropylene composition according to claim 1, having a Shore D hardness of not more than 50.

3. The heterophasic polypropylene composition according to claim 1, having a Shore A hardness of not more than 100.

4. The heterophasic polypropylene composition according to claim 1, having a total amount of comonomer units of from 6.0 to 35.0 wt %, based on the total amount of the heterophasic polypropylene composition.

5. The heterophasic polypropylene composition according to claim 1, having a melting temperature of from 135° C. to 165° C.

6. The heterophasic polypropylene composition according to claim 1, having a melt flow rate MFR$_2$ (230° C., 2.16 kg) of from 0.05 to 100 g/10 min.

7. The heterophasic polypropylene composition according to claim 1, wherein the crystalline fraction (CF) has an intrinsic viscosity iV of from 1.0 to 7.0 dl/g.

8. The heterophasic polypropylene composition according to claim 1, wherein the crystalline fraction (CF) is a copolymer fraction of propylene monomer units and ethylene comonomer units.

9. The heterophasic polypropylene composition according to claim 1, wherein the soluble fraction (SF) is a copolymer fraction of propylene monomer units and ethylene comonomer units.

10. A process for preparing the heterophasic polypropylene composition according to claim 1, comprising the steps of:
    a) polymerizing propylene and optionally comonomer units selected from ethylene or alpha-olefins with 4 to 12 carbon atoms in a first polymerization reactor in the presence of a single-site catalyst to produce a first polymerization mixture comprising a first propylene homo- or copolymer and the single-site catalyst;
    b) transferring the first polymerization mixture into a second polymerization reactor;
    c) polymerizing propylene and comonomer units selected from ethylene or alpha-olefins with 4 to 12 carbon atoms in said second polymerization reactor in the presence of said single-site catalyst to produce a second polymerization mixture comprising a second propylene copolymer, said first propylene homo- or copolymer and the single-site catalyst, wherein the weight ratio of said first propylene homo- or copolymer to said second propylene copolymer is in the range of 20:80 to 55:45;
    d) withdrawing said second polymerization mixture from said second polymerization reactor; and
    e) compounding said second polymerization mixture optionally with the addition of additives to form the heterophasic polypropylene composition.

11. The process according to claim 10, wherein the single-site catalyst comprises (i) a complex formula (I):

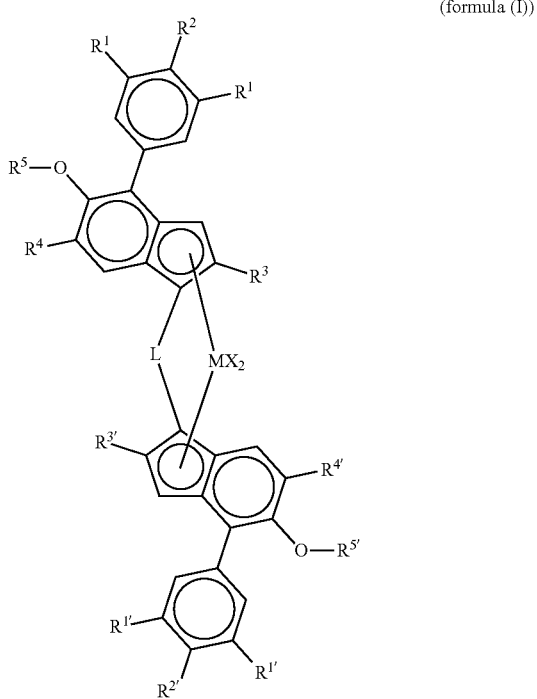

(formula (I))

wherein
M is zirconium or hafnium;
each X independently is a sigma-donor ligand
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing one or more heteroatoms of Group 14-16 of the periodic table or fluorine atoms, or optionally two R' groups taken together can form a ring;
R$^1$ and R$^{1'}$ are each independently hydrogen, C$_5$-C$_{10}$-aryl or a group —CH(R$_x$)$_2$ wherein each R$^x$ is independently H or a C$_{1-10}$ hydrocarbyl group, and optionally the two R$^x$ taken together can form a ring,
R$^2$ and R$^{2'}$ are each independently hydrogen, C$_5$-C$_{10}$-aryl or a group —C(R$^y$)$_3$
wherein each R$^y$ is independently H or a C$_{1-10}$ hydrocarbyl group, or optionally two or three R$^y$ groups taken together can form a ring,
whereby at least one of R$^1$ or R$^2$ and one of R$^{1'}$ or R$^{2'}$ is different from hydrogen and
whereby R$^2$ together with one of R$^1$, as well as R$^{2'}$ together with one of R$^{1'}$ can be part of a further mono- or multicyclic ring condensed to the phenyl ring
R$^3$ and R$^{3'}$ are each independently a linear C$_1$ to C$_6$ hydrocarbyl group or a branched or cyclic C$_4$ to C$_{10}$ hydrocarbyl group, whereby the groups are not branched in α-position
R$^4$ and R$^{4'}$ are each independently a tertiary C$_4$ to C$_{10}$ hydrocarbyl group
R$^5$ and R$^{5'}$ are each independently a linear or branched C$_1$ to C$_{10}$ alkyl group or an C$_5$-C$_{10}$-aryl group and
(ii) a cocatalyst comprising a compound of a group 13 metal.

12. The process according to claim 10, wherein the single-site catalyst comprises (i) a complex formula (II):

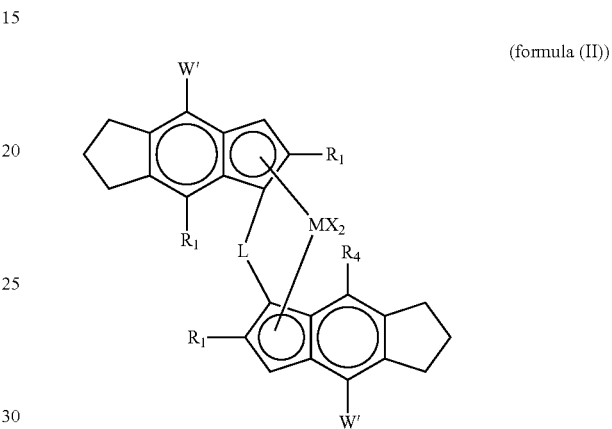

(formula (II))

wherein
M is Zr or Hf;
each R$_1$ is a linear or branched C$_{1-10}$ alkyl;
L is ethylene or Si(R6)$_2$;
R$_6$ is C$_{1-10}$ alkyl, C$_{6-10}$-aryl, C$_{7-12}$-alkylaryl, or C$_{7-12}$-arylalkyl;
each X is a hydrogen atom, C$_{1-6}$-alkoxy, a halogen atom, or an R group;
R is C$_{1-10}$ alkyl
each R$_4$ is H or C$_{1-3}$-alkyl;
W' is phenyl, pyridyl, thiophenyl or furyl optionally substituted by up to 2 groups R$_5$;
each R$_5$ is C$_{1-10}$-alkyl or two adjacent R$_5$ groups taken together form a phenyl ring fused to W', and
(ii) at least an alumoxane or a compound able to form an alkylmetallocene cation.

13. An article comprising the heterophasic polypropylene composition according to claim 1.

* * * * *